(12) United States Patent
Lorenzo et al.

(10) Patent No.: US 12,711,336 B2
(45) **Date of Patent: *Aug. 18, 2026**

(54) OBJECT IDENTIFICATION AND TRACKING IN DEFINED SPACES

(71) Applicant: Baitboxx LLC, Boonton, NJ (US)

(72) Inventors: Justin Lorenzo, Newton, NJ (US); Paul Lorenzo, Dover, NJ (US); Michael Acre, Lincoln Park, NJ (US)

(73) Assignee: Baitboxx LLC, Boonton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/037,584

(22) Filed: Jan. 27, 2025

(65) Prior Publication Data

US 2025/0173528 A1 May 29, 2025

Related U.S. Application Data

(63) Continuation of application No. 18/222,299, filed on Jul. 14, 2023, now Pat. No. 12,210,929.

(51) Int. Cl.
*G06K 7/10* (2006.01)

(52) U.S. Cl.
CPC ................................ *G06K 7/10366* (2013.01)

(58) Field of Classification Search
CPC ....................... G06K 7/10366; G06K 7/10356
See application file for complete search history.

(56) References Cited

U.S. PATENT DOCUMENTS 8,678,281 B2 3/2014 Kangas et al.
12,210,929 B1 * 1/2025 Lorenzo ............. G06K 7/10366
2008/0211671 A1 9/2008 Daily
2014/0222603 A1 8/2014 Hay
2017/0053505 A1 * 2/2017 Lauria .................. G06Q 10/087
2020/0320476 A1 * 10/2020 Ellis ................... G06K 17/0022
2022/0108270 A1 4/2022 Puerini et al.

OTHER PUBLICATIONS

"Self-checkout gets smarter, faster", eeNews Europe, accessed at hllps://www.eenewseurope.com/en/self-checkout-gets-smarter-faster/, Feb. 18, 2020.
AtlasRFIDstore | RFID Kiosks, accessed at hllps://www.allasrfidstore.com/rfid-kiosks, on Jul. 19, 2023.
Rain Alliance | RFID-enabled self-checkout gets smarter, faster, accessed at https://rainrfid.org/rfid-enabled-self-checkout-gets-smarter-faster/, Feb. 19, 2020.

* cited by examiner

*Primary Examiner* — Matthew Mikels
(74) *Attorney, Agent, or Firm* — HG LAW LLP

(57) ABSTRACT

An apparatus comprises a first interior space coupled to a second interior space, wherein each interior space has a corresponding RFID reader associated with the interior space configured to identify objects within the respective interior space. The apparatus further comprises an exterior surface having an external passageway enabling access to the first and second interior spaces. The first and second interior spaces are separated by electromagnetic shielding, and the interior spaces are shielded from an exterior RFID reader, wherein the exterior RFID reader is configured to identify objects leaving through the external passageway.

20 Claims, 14 Drawing Sheets

100
114
116
108
Counter
110
Second Interior Space
104
112
109
106
112
First Interior Space
102

OBJECT IDENTIFICATION AND TRACKING IN DEFINED SPACES

CROSS REFERENCE TO RELATED APPLICATIONS

This application is a continuation of U.S. patent application Ser. No. 18/222,299, filed Jul. 14, 2023, the disclosures of which is hereby incorporated by reference herein in its entirety.

INTRODUCTION

The present disclosure is directed to determining whether one or more objects are removed from a location based on radio-frequency identification (RFID) scanning of the location and of nearby spaces.

SUMMARY

In some inventory tracking applications, difficulties may arise when objects are moved around and shifted through different areas by different people or devices, particularly as multiple sensors in different regions detect the objects. For example, in order to cover a specific space, a single sensor may not provide a sufficient range to cover the entire space, and multiple sensors may be utilized in order to scan the entire space. In such an example, objects may be difficult to track when multiple sensors overlap and identify the objects as being within range, and there may be blind spots between sensors (e.g., due to sensor placement or other devices obstructing sensor scans). Misleading or incorrect sensor scan results may also occur when objects are moved and stacked on top of one another, which can result in obstruction or interference of the RFID tags. For example, in some applications utilizing RFID scans to simultaneously identify a plurality of RFID tags (e.g., in some checkout applications where a user may place all selected objects into a single cart to be scanned), if an object with an RFID tag is stacked on a metal object, the scanning sensor may fail to detect the RFID tag due to interference from the metal object.

In accordance with some embodiments of the present disclosure, a set of defined spaces may be generated, where each space includes respective RFID antennas connected to a respective RFID reader to scan and identify RFID tagged objects, and where each space is separated from other spaces by electromagnetic shielding (e.g., such that RFID scanning in one space should not detect items in other spaces). In some embodiments, the defined spaces may include an inventory space and a checkout space, where a user may select objects from the inventory space and move the objects to the checkout space, such that the RFID scans of one or both spaces, including high and/or low-power RFID scans may be utilized to identify and track objects.

In accordance with some embodiments of the present disclosure, an apparatus comprises a first interior space coupled to a second interior space, a first RFID reader associated with the first interior space and configured to identify objects within the first interior space, a second RFID reader associated with the second interior space and configured to identify objects within the second interior space, and an exterior surface having an external passageway enabling access to the first and second interior spaces. The first and second interior spaces are separated by electromagnetic shielding, and the interior spaces may be shielded from an exterior RFID reader configured to identify objects leaving through the external passageway.

In some embodiments, the apparatus further comprises an internal passageway between the first interior space and the second interior space, where the internal passageway comprises a door or door curtain that comprises electromagnetic shielding. In some embodiments, the second interior space may comprise a counter capable of holding objects, and a first RFID antenna is positioned under the counter and a second RFID antenna is positioned on a wall or ceiling of the second interior space.

In some embodiments, the apparatus further comprises control circuitry configured to generate a first list of objects within the first interior space based on the first RFID reader, generate a second list of objects within the second interior space based on the second RFID reader, and generate a third list of objects that left through the external passageway, based on the exterior RFID reader. In some embodiments, the control circuitry may be configured to determine a starting list of objects in the first interior space, and determine a list of objects moved from the first interior space to the second interior space when objects are detected in the second interior space (e.g., using the second RFID reader), or when the objects are not detected in the first interior space (e.g., using the first RFID reader).

In accordance with some embodiments of the present disclosure, a method comprises performing an RFID scan of a first interior space to identify objects within the first interior space and then performing low-power RFID scanning of a second interior space during a time period to identify objects moved from the first interior space to the second interior space. In some embodiments, the first and second interior spaces are separated by electromagnetic shielding. In response to an input, the method further comprises performing a high-power RFID scan of the second interior space to identify objects in the second interior space, and then determining a list of objects moved to the second interior space based on the low-power RFID scanning and the high-power RFID scanning of the second interior space.

In some embodiments, the method further comprises performing exterior RFID scanning to identify objects leaving the second interior space through an external passageway. In some embodiments, the method further comprises initiating an authenticated session, providing credentials for unlocking an exterior door providing access to the first and second interior spaces, and then later detecting the input from the user on a user interface within the second interior space.

In accordance with some embodiments of the present disclosure, a method comprises performing a RFID scan of a first interior space at a first time to identify objects within a first interior space, performing a RFID scan of a second interior space, at a second time later than the first time, to identify objects in the second interior space, and then performing a RFID scan of the first interior space at a third time later than the first time to identify objects removed from the first interior space. The method further comprises determining, based on the RFID scans, that one or more objects were removed from the first interior space when the one or more objects are detected in the second interior space and/or not detected in the first interior space.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
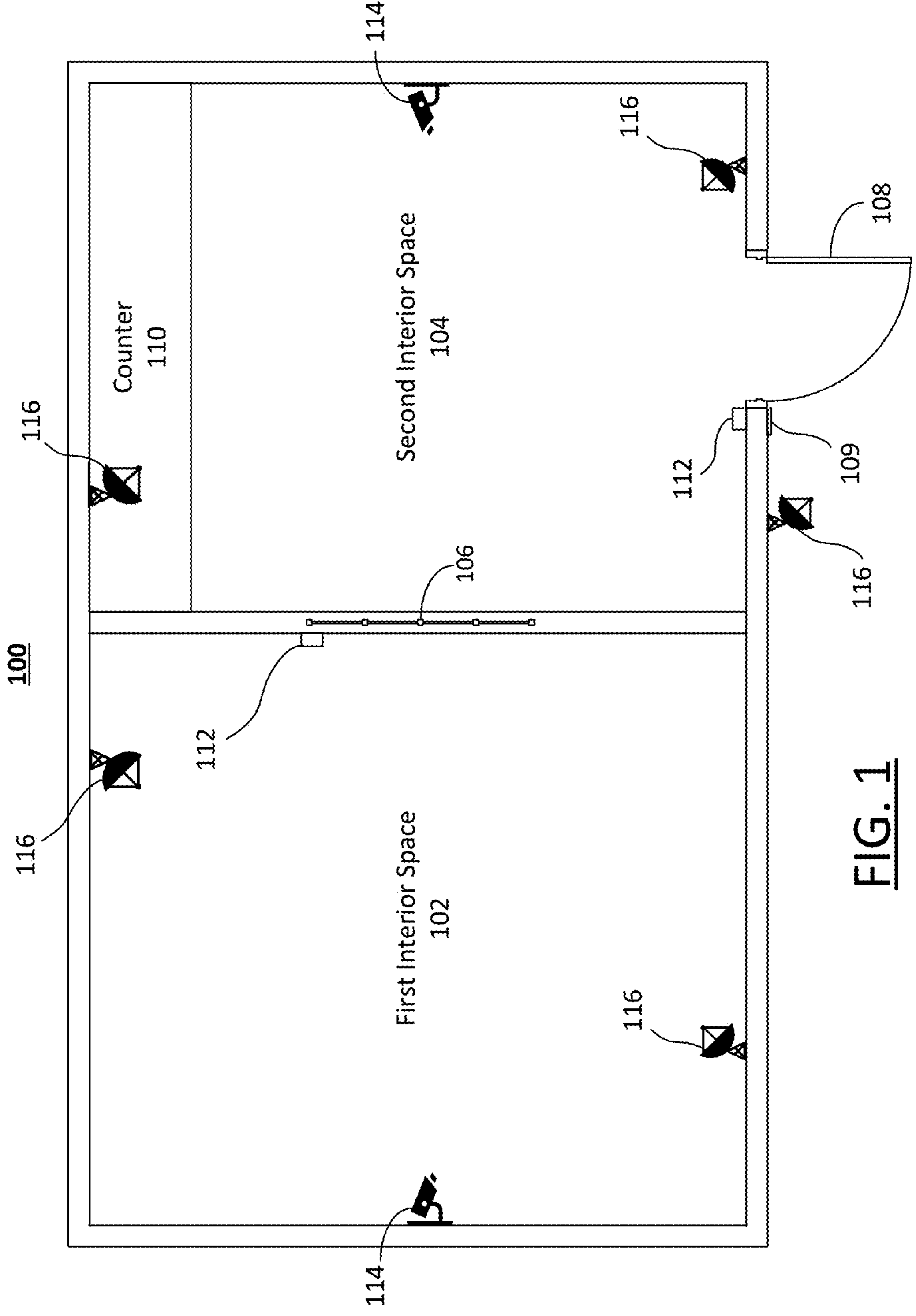
FIG. 1 shows an illustrative diagram of an apparatus that includes a first interior space and a second interior space, in accordance with some embodiments of the present disclosure.

In some applications and activities, such as fishing, it may be difficult to acquire needed supplies and other related items. For example, preparing for fishing may involve obtaining live or frozen bait and tackle items. However, fishing may involve early departure times when bait and tackle stores are not yet open. In such situations, one would typically need to travel to a bait and tackle store a day or more before and then have to store the bait in appropriate conditions until leaving for fishing.

In accordance with some embodiments of the present disclosure, an apparatus is provided containing a storage of inventory objects in one or more spaces for users to conveniently access. The apparatus may be located, for example, in a location proximate to where the users may engage in the corresponding activity. In some embodiments, radio-frequency identification (RFID) scanning technologies may be utilized to automate processes relating to determining which objects the user selects and removes from the inventory, such that the inventory may be accessed by users at any time, and without any administrative personnel needing to be present in the apparatus. As used herein, RFID scanning encompasses any radio-frequency identification techniques and may encompass signals having any suitable wavelength, bandwidth, and/or frequency band (e.g., ultra-wideband).

In some embodiments, each inventory item may have an associated RFID tag, where each RFID tag has a unique identification number. Before an object is placed into the inventory, the object may be coupled to the RFID tag. RFID antennas located on or within the apparatus may perform electromagnetic scans that can identify RFID tags in a scanning location. The apparatus may be separated into spaces, such as an exterior space, and one or more interior spaces (e.g., a first interior space and a second interior space). Based on RFID scan results in each of the spaces, it can be accurately determined which objects the user removes from the inventory, and the user that removed the objects may be associated with the removed objects. As used herein, an interior space includes spaces that are fully enclosed, where the interior space is surrounded by walls, a floor, and a ceiling, and spaces that are partially enclosed. For example, an interior space in accordance with the present disclosure may be partially enclosed, such that the interior space is surrounded with walls and has a floor, but does not have a ceiling. In another suitable example, a partially enclosed interior space may have an open side (e.g., missing one or more walls), where a user may enter. Additionally, as used herein, interior spaces include any spaces that can be scanned without identifying items in adjacent spaces. For example, a continuous but winding path may be result in multiple interior spaces, such that each interior space can be appropriately scanned by RFID scanning (e.g., to determine which objects are in the respective interior space) and not detect items in another or adjacent interior space.

FIG. 1 shows an illustrative diagram of an apparatus 100 that includes a first interior space 102 and a second interior space 104, in accordance with some embodiments of the present disclosure. Apparatus 100 may have an exterior surface or wall with an exterior door 108, where exterior door 108 functions as an external passageway and enables access from the exterior space to the interior spaces. In some embodiments, the exterior door 108 may be directly connected to the second interior space 104, and the second interior space 104 may be separated from the first interior space 102 by an internal passageway (e.g., a doorway) that includes an electromagnetic shielding curtain 106.

In some embodiments, the first interior space 102 may be an inventory room, and the second interior space 104 may be a checkout room. In some embodiments, the inventory room may include a plurality of inventory objects that may be removed from the inventory room, and each inventory item may be equipped with a unique RFID tag (e.g., where each inventory item has a different identification number that is associated with the item, so that when a RFID scan detects a particular number, the associated item may subsequently be determined). In some embodiments, inventory objects may be categorized into different types, where each type of object has a respective range of identification numbers. For example, frozen objects may be given identification numbers in the 1-1000 range, and dry good objects may be given identification numbers in the 1001-2000 range. Therefore, by detecting an identification number (e.g., via a RFID scan), information about the detected objects may easily be identified, based on the detected identification number. Each interior space and/or an exterior space may have one or more sensors monitoring the respective interior space. In some embodiments, the sensors may include cameras 114, RFID antennas 116, motion sensors, audio sensors, any other suitable sensor devices, or a combination thereof. As shown, for example, each space may have one or more RFID antennas 116 as well as at least one camera 114 located in the space, where the one or more RFID antennas 116 in each space are connected to an RFID reader unit (not shown) that receives information (e.g., signals) from RFID scans performed by the one or more RFID antennas 116. The first interior space 102 may include one or more first RFID antennas, and the second interior space 104 may include one or more second RFID antennas. The first RFID antennas may be coupled to a respective first RFID reader unit, and similarly the one or more second RFID antennas may be coupled to a second RFID reader unit. The RFID reader units may be connected to a central processor (e.g., processor 1104), where the central process may coordinate the scans performed by the RFID reader units, identify objects corresponding to identified RFID tags, and otherwise perform the methods described herein. As described herein, when RFID scanning is performed in a space, it will be understood that the RFID signals may be emitted and received by one or more associated RFID antennas in the space. It will also be understood that, as used herein, an RFID reader refers to hardware and/or software capable of performing a RFID scan of a space. In some embodiments, a first RFID reader corresponds to one or more antennas and a RFID reader unit and a second RFID reader corresponds to separate one or more antennas and a separate RFID reader unit. In some embodiments, a single RFID reader unit may be coupled to antennas associated with different spaces such that multiple RFID readers share the single RFID reader unit.

Passageways, such as the doorway between the first interior space 102 and the second interior space 104, as well as the exterior door 108, may each be equipped with a doorway sensor 112 that may detect a current position of the respective passageway (e.g., open or closed). For example, a doorway sensor 112 connected to exterior door 108 may detect whether the exterior door 108 is opened or closed. When exterior door 108 moves from a closed position to an open position, this may indicate that a user has opened and/or traversed through the exterior door 108. Furthermore, each space (i.e., each interior space and the exterior space) may be separated by electromagnetic shielding, such that RFID antennas scanning one space does not pick up RFID tags located in other spaces. For example, due to the electromagnetic shielding curtain 106 and shielding within the interior wall, a RFID scan of the first interior space 102 (e.g., to check inventory objects present in the first interior space 102) should not pick up objects located in the second interior space 104 or the exterior space outside the exterior door 108. In some embodiments, the electromagnetic shielding may be installed in interior and external passageways (e.g., the electromagnetic shielding curtain 106 separating the first interior space 102 and the second interior space 104, as described above). In some embodiments, appropriate walls of apparatus 100 may additionally be equipped with electromagnetic shielding (e.g., to prevent RFID scans of the exterior space from detecting objects in the interior space, and vice versa). For example, a wall of apparatus 100 that is proximate to the exterior door 108 may be shielded, while walls not separating adjacent spaces, such as a floor and/or a ceiling, may forgo electromagnetic shielding. It will be understood that electromagnetic shielding includes materials that absorb signals, reflect signals, or otherwise interfere with signals such that RFID interrogation signals from a first space are not successfully received by RFID tags in a second space and/or such that RFID response signals from the second space are not successfully received by a RFID reader in the first space.

In some embodiments, a user may initiate an authenticated session, where during the authenticated session the user is allowed to access the interior spaces and the inventory objects. In some embodiments, the authenticated session may be initiated from a mobile application (e.g., on a user device), by inputting a code on an access panel 109 proximate to the exterior door 108, any other suitable device, or a combination thereof. Once the authenticated session is initiated, the user may proceed through the external passageway to reach the second interior space 104, and then the user may further continue through the electromagnetic shielding curtain 106 to reach the first interior space 102 that contains the inventory objects. The user may proceed to select any number of objects from the available inventory objects, and then move the selected objects into the second interior space. In some embodiments, while the authenticated session is active, all inventory objects moved out of the first interior space 102 may be associated with the user.

Second interior space 104 may further include a counter 110 that the user may put the selected objects on. In some embodiments, to more accurately identify the objects that the user has selected, one or more RFID antennas 116 may be placed directly under counter 110, as shown. In some embodiments, the RFID antennas 116 in the second interior space 104 may be continuously scanning in a low-power mode during an authenticated session (e.g., to detect if inventory item movement is occurring). Once the user has verified that they have completed selecting inventory objects and have placed all selected objects on counter 110 (or elsewhere in second interior space 104), a high power RFID scan may be performed by the one or more RFID antennas 116, where the high power RFID scan can more accurately determine which inventory objects are located in the second interior space 104. In some embodiments, inventory objects detected during the high-power RFID scan may be associated with the user, and a list of all associated objects may then be provided to the user. In some embodiments, inventory objects detected during the high-power RFID scan and during the low-power RFID scan may be associated with the user (e.g., when the objects are not also detected in the first interior space 102), and a list of all associated objects may then be provided to the user. For example, the list may be provided on a user display device located on counter 110, or may be sent to the user device by email, text, or a combination thereof. In some embodiments, the high-power RFID scan sends out RFID interrogation signals at a higher power than the low-power RFID scan. In some embodiments, the high-power RFID scan uses a higher reader sensitivity setting than the lower power RFID scan, where reader sensitivity corresponds to, for example, the lowest power signal that the reader can detect. In some embodiments, the high-power RFID scan sends out RFID interrogation signals at a higher power and uses a higher reader sensitivity than the low-power RFID scan.

In some embodiments, the user may be given the option to edit or remove objects on the provided list, or to request a rescan (in case of any erroneous readings from the RFID scanning). Additionally, in some embodiments, while the high-power RFID scanning is being performed in the second interior space 104, RFID scans may also be performed in other spaces equipped with RFID antennas (e.g., the first interior space 102 and the exterior space). For example, if inventory objects are detected in an exterior RFID scan, the detected objects may automatically be added to the list of objects associated with the user. If inventory objects are flagged as missing from a RFID scan of the first interior space 102 but are not detected in the second interior space 104 or the exterior space, the missing objects may be associated with the user, and the user may receive a prompt (e.g., on the user display) to verify that the missing objects are in the first interior space 102 in order to disassociate the missing objects with the user. In some embodiments, the cameras 114 may be utilized in order to confirm locations of missing objects in order to resolve discrepancies in RFID scans.

Figure 2A:
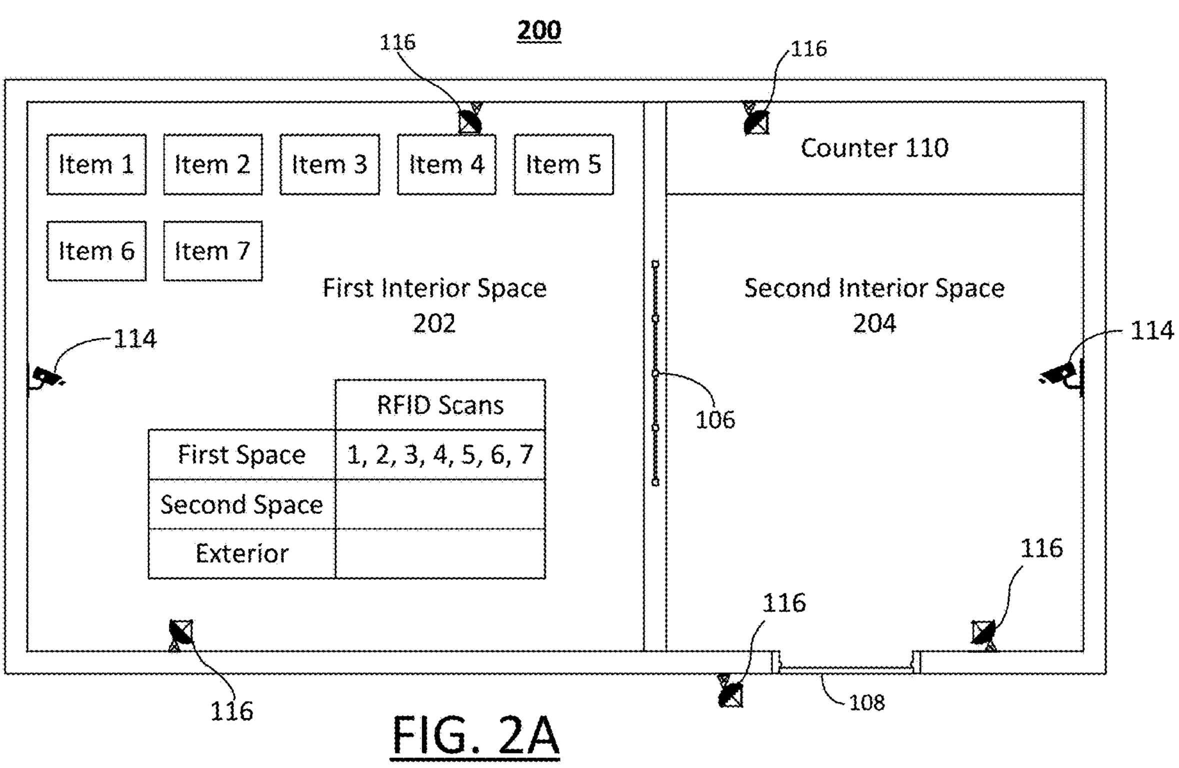
FIG. 2A shows an illustrative diagram of apparatus before an authenticated user session occurs, in accordance with some embodiments of the present disclosure.

FIG. 2A shows an illustrative diagram of apparatus 200 before an authenticated user session occurs, in accordance with some embodiments of the present disclosure. In some embodiments, FIG. 2A may also depict the apparatus 200 immediately after an authentication session ends (e.g., after a prior user has left the interior spaces with an associated list of objects). As shown, apparatus 200 includes a similar architecture as that of apparatus 100, and further includes seven inventory objects located in the first interior space 202. It will be understood that other suitable embodiments may include more or fewer than seven inventory objects. Each inventory item has an associated RFID tag (e.g., that provides a unique identification number), and therefore a RFID scan performed on apparatus 200 (e.g., by RFID antennas 116 located in each space) may yield the result shown in the "RFID Scans" table included in FIG. 2A.

Figure 2B:
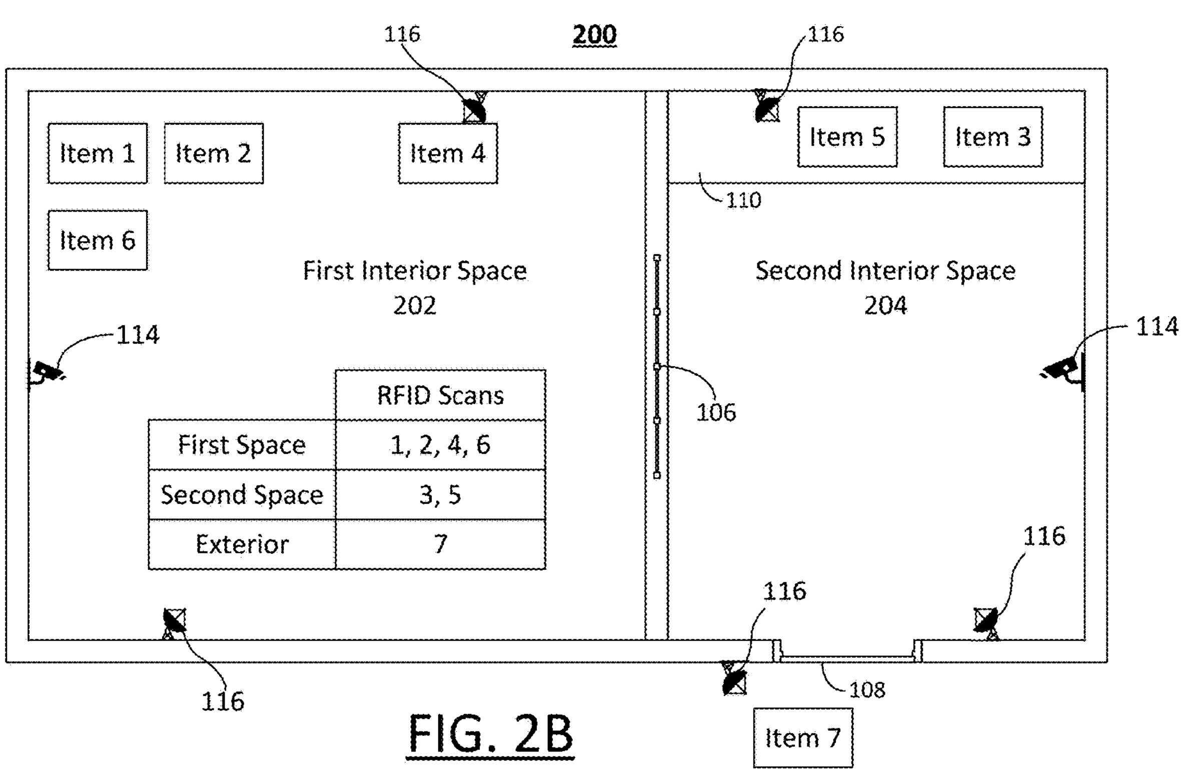
FIG. 2B shows an illustrative diagram of apparatus during an authenticated user session, in accordance with some embodiments of the present disclosure.

FIG. 2B shows an illustrative diagram of apparatus 200 during an authenticated user session, in accordance with some embodiments of the present disclosure. As shown, of the initial seven inventory objects from FIG. 2A, items 3, 5, and 7 were removed from the first interior space 202. In some embodiments, the user may have placed items 3 and 5 on a counter (e.g., counter 110) in the second interior space 204, where an RFID scan of the second interior space 204 will detect items 3 and 5 and then associate the scanned objects with the user. Item 7 may have been scanned by an exterior RFID scan. In some embodiments, item 7, when detected by an exterior RFID scan during an authenticated user session, may automatically be associated with the user, even if the user has not initiated a high-power scan of the second interior space 204. In some embodiments, item 7, when detected by an exterior RFID scan, may cause a warning or alert to be sent to the user. The warning or alert may be displayed on a user display (e.g., on the counter), sent by email or text to a user device, or a combination thereof.

When the user has initiated a high-power RFID scan of the second interior space 204, RFID scanning may also be performed in the first interior space 202 to verify the inventory objects remaining in the first interior space 202. The results of all the RFID scans performed in FIG. 2B are displayed in the "RFID Scans" table. As shown, all seven inventory objects have been detected in one of the spaces, and as a result of the RFID scans, items 3, 5, and 7 are associated with the user. However, as mentioned above, in some situations the RFID scans may yield incorrect results (e.g., due to improper placement of the electromagnetic shielding curtain 106, a partially or fully blocked RFID tag, variance in readings leading to an incorrect result, some other source of error, or a combination thereof), and so therefore the user may be given an option to manually remove an item that is associated with the user. For example, the user may choose to remove item 5 from a list of objects displayed to the user (where the list would include objects 3, 5, and 7), and a rescan may then be performed (e.g., at high or full power) to verify that item 5 is currently in the first interior space 202. If item 5 is detected in the first interior space 202, item 5 may then be disassociated from the user. It will be understood, however, that other erroneous RFID scans may occur. For example, an additional example of resolving incorrect RFID scan results is described below in connection with FIG. 3.

Figure 3:
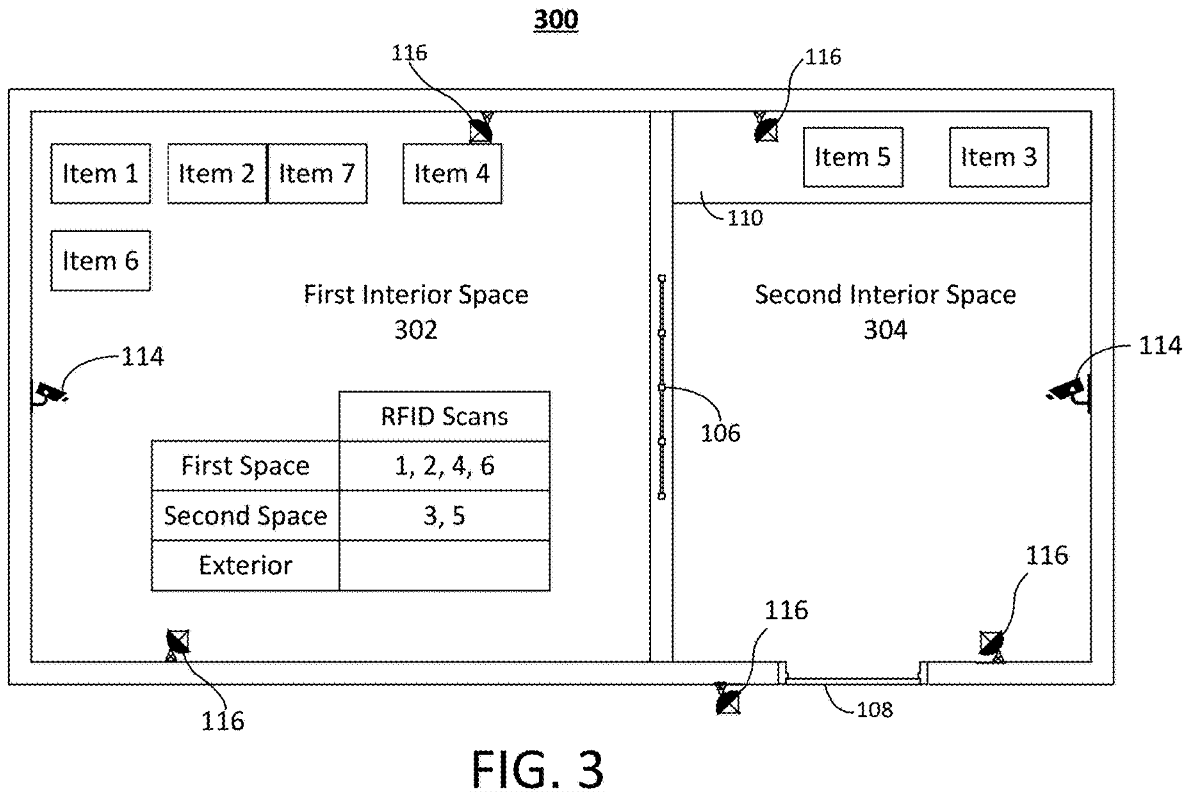
FIG. 3 shows an illustrative diagram of an apparatus during an erroneous RFID scan, in accordance with some embodiments of the present disclosure.

FIG. 3 shows an illustrative diagram of an apparatus 300 during an erroneous RFID scan, in accordance with some embodiments of the present disclosure. Similar to FIG. 2A, apparatus 300 may include a similar architecture as that of apparatus 100, and further includes seven inventory objects, although it will be understood that other suitable embodiments may include more or fewer than seven inventory objects.

As shown, after all RFID scans in each space have been performed, the results (shown in the "RFID Scans" table) indicate that item 7 was not detected in any of the spaces. Item 7 may not have been detected, for example, because the user may have moved the item within the first interior space 302 such that the RFID antennas 116 located in the first interior space 302 are not able to read the RFID tag associated with item 7.

After item 7 is not detected by the RFID scans, item 7 may automatically be associated with the user, and the user may also be provided with an alert or warning (e.g., on a user display in second interior space 304, sent to a user device, or a combination thereof) that item 7 is missing. The user may be given an option to locate the item in the first interior space 302 and manually disassociate the item, or if a later scan is properly able to detect item 7 in the first interior space 302, then item 7 may also be disassociated with the user. However, if the user manually disassociates item 7 but the system does not identify the location of item 7, then footage taken from cameras 114 (in particular, the camera located in the first interior space 302) during the authenticated session may be saved and flagged for further review. Based on the video footage captured from the cameras 114, the status of item 7 may be updated. If the video footage captured from cameras 114 does not provide the location of item 7, then a manual inspection may be further performed to confirm if item 7 is still in the first interior space 302. If item 7 is not located during any of the backup checks, then item 7 will remain associated with the user.

Figure 4:
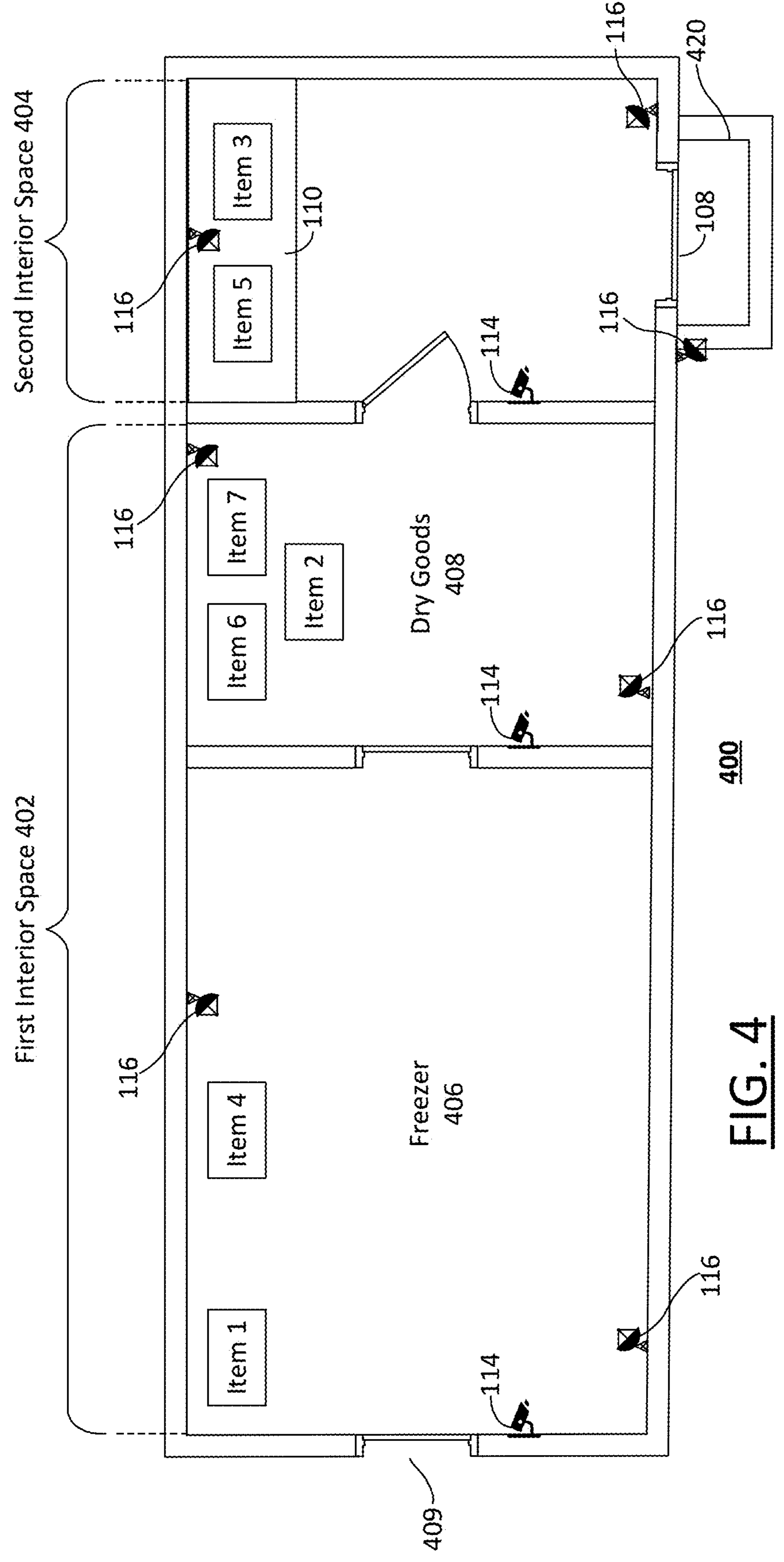
FIG. 4 shows an illustrative diagram of an apparatus that includes a first interior space with multiple subspaces, in accordance with some embodiments of the present disclosure.

FIG. 4 shows an illustrative diagram of an apparatus 400 that includes a first interior space 402 with multiple sub-spaces, in accordance with some embodiments of the present disclosure. Apparatus 400 includes a second interior space 404 that is similar in design and function to that of second interior space 104 in apparatus 100. However, the first interior space 402 is divided into both a freezer space 406 and a dry goods space 408. In some embodiments, the interior space of apparatus 400 may be partitioned such that the freezer space 406 is 50% of the interior space, the dry goods space 408 is 25% of the interior space, and the second interior space 404 (i.e., the checkout space) is 25% of the interior space. Accordingly, some inventory objects in the first interior space 402 may be stored in freezer 406, in dry goods 408, and/or may have been removed by a user during an authenticated session from the first interior space 402 (e.g., and moved to second interior space 404 or to an exterior space via exterior door 108). As shown, for instance, objects 1 and 4 may be stored in freezer 406, objects 2, 6, and 7 are stored in dry goods 408, and objects 3 and 5 have been moved to a counter (e.g., counter 110) in the second interior space 404. As also shown, freezer 406 includes an emergency exit 409, which provides an alternative way of leaving freezer 406. In some embodiments, one or more antennas 116 may also be located on the exterior of apparatus 400 proximate to emergency exit 409. Apparatus 400 also includes steps 420 outside of exterior door 108.

It is noted that objects stored in freezer 406 may spoil, rot, or become otherwise unusable if moved to dry goods 408 for storage. For instance, if item 3 was originally stored in freezer 406, and the user selects to return item 3 but places item 3 in dry goods 408, then upon detecting item 3 in dry goods 408 (or not detecting item 3 being returned to freezer 406) the user may continue to be associated with item 3, and may receive a warning and/or alert that they have misplaced item 3. Therefore, even if the user returns item 3 to the first interior space 402, the user will not become disassociated with item 3 unless item 3 is detected in freezer 406 (e.g., via RFID scans, a camera 114 located in freezer 406, etc.). It will be understood that each item may have an appropriate return location; for example, some objects may only be appropriately returned to freezer 406, some objects may only be appropriately returned to dry goods 408, and some other objects may be returned to either freezer 406 or dry goods 408.

As previously described, apparatuses 100, 200, 300, and/or 400 may contain inventory objects related to a particular activity, and may also be located in a location proximate to where users may engage in the corresponding activity. For example, for an apparatus containing inventory objects related to fishing, the apparatus may be located proximate to a fishing site. Although not shown, it will be understood that any or all of the apparatuses 100, 200, 300, and 400 described above may be powered by an onboard diesel generator, a proximate power source (e.g., where the apparatuses may be coupled to the power source), some other suitable sources of power, or a combination thereof. In some embodiments, apparatuses 100, 200, 300, and 400 are implemented as movable trailers and located, for example, in a dry slip at a marina.

Figure 5:
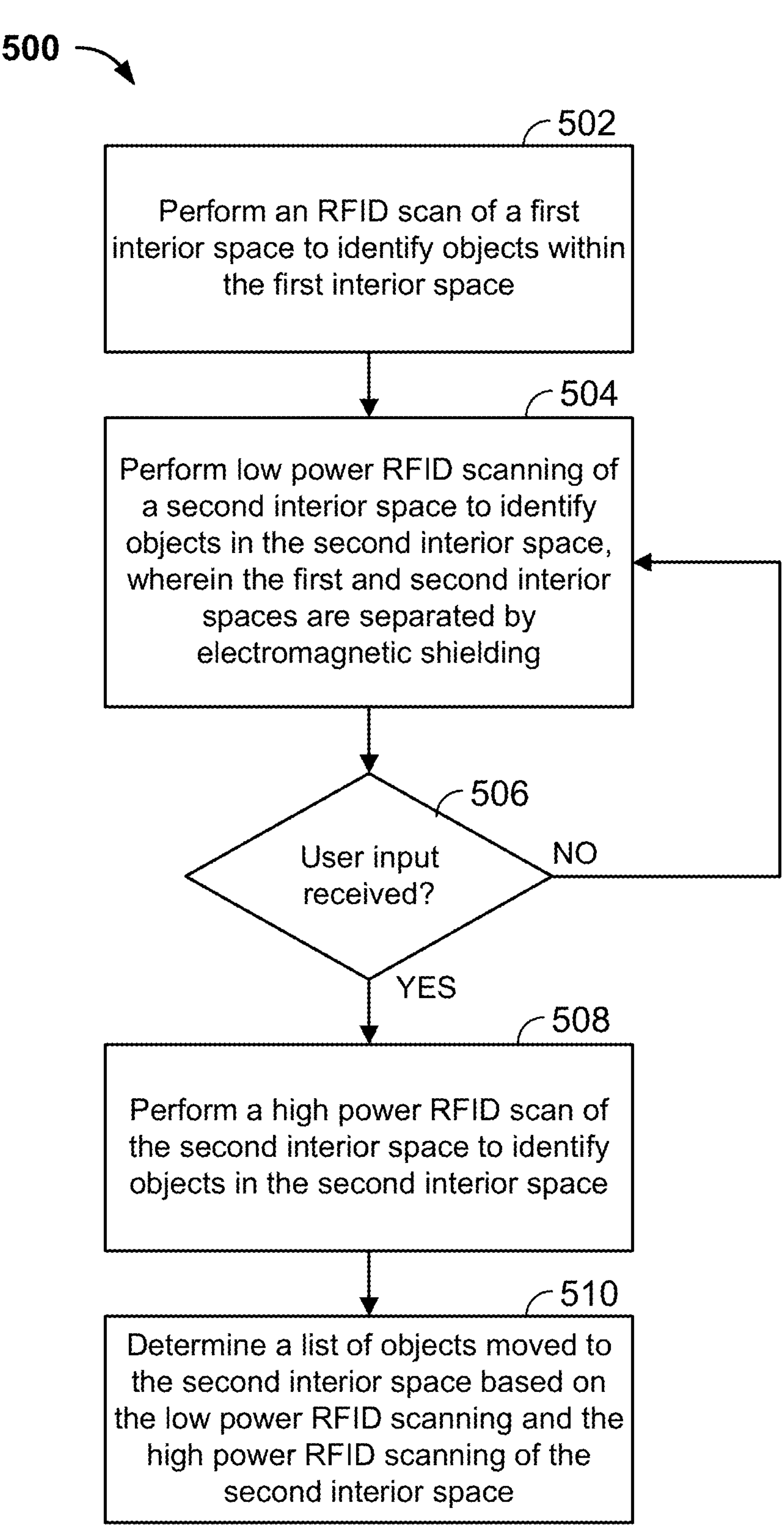
FIG. 5 shows a flowchart of illustrative steps for determining a list of objects moved from a first interior space to a second interior space, in accordance with some embodiments of the present disclosure.

FIG. 5 shows a flowchart 500 of illustrative steps for determining a list of objects moved from a first interior space to a second interior space, in accordance with some embodiments of the present disclosure. The steps of FIG. 5 may be performed, for example, using a processor (e.g., processor 1104 of FIG. 11). In some embodiments, the process depicted in FIG. 5 may occur during an authenticated session in which a user is present within the interior spaces. Although FIG. 5 is described in the context of the particular structures, components, and processing of the present disclosure, and although a particular order and flow of steps are depicted in FIG. 5, it will be understood that in some embodiments, one or more of the steps may be modified, moved, removed, or added, and that the order of steps depicted in FIG. 5 may be modified.

Processing begins at step 502, where a RFID scan of a first interior space is performed to identify objects within the first interior space. The first interior space may include a plurality of inventory objects, as described previously in connection with FIGS. 1-4. In some embodiments, the first interior space may include a plurality of subspaces (e.g., freezer 406 and dry goods 408 of FIG. 4), where some inventory objects of the plurality of inventory objects may be stored in each respective subspace. Step 502 may be performed before the user starts an authenticated session or in response to starting an authenticated session in order to determine a list of available inventory objects. In some embodiments, future RFID scans of the first interior space performed during or after the authenticated session may be compared to the RFID scan performed at step 502, and the difference between the two RFID scans may be used to determine or confirm which objects were removed from the first interior space during the authenticated session. In embodiments where the first interior space is divided into a plurality of subspaces, each subspace may perform individual RFID scans to determine which objects are in the respective subspace, so that it is possible to determine if inventory objects are moved from one subspace to another within the first interior space. Processing may then continue to step 504.

At step 504, low-power RFID scanning of a second interior space may be performed to identify objects in the second interior space. It will be understood that the first interior space may be separated from the second interior space by electromagnetic shielding, such that RFID scans in the first interior space should not detect objects located in the second interior space, and such that RFID scans in the second interior space should not detect objects located in the first interior space. In some embodiments where step 502 is performed before a user initiates an authenticated session, step 504 may then be performed once the authenticated session is initiated, and the low-power RFID scanning of the second interior space may continue while the authenticated session is active, or until the low-power RFID scanning is manually stopped. In some embodiments, the low-power RFID scanning may occur even while the interior passageway (between the first interior space and the second interior space) is open. The power level may be selected such that the low-power RFID scan should not detect inventory objects in the first interior space. In some embodiments, the low-power RFID scanning may occur only when the interior passageway is closed (e.g., as detected by a doorway sensor 112). In some embodiments, the low-power RFID scanning of the second interior space may occur in combination with continuous exterior RFID scanning, such that inventory objects cannot be moved outside the interior spaces without being detected. Processing may then continue to step 506.

At step 506, the processor determines if a user input is received. Step 506 may occur repeatedly in tandem with the low-power RFID scanning of step 504 until a user input is received, until the authenticated session ends, until the process described in connection with FIG. 5 is manually reset, or a combination thereof. The user input may be received, for example, by a touch input (e.g., from the user) on a user display that includes a touch screen. In some embodiments, the touch screen/user display may be located on a counter (e.g., counter 110) in the second interior space. In some embodiments, the user may perform the input when the user has finished selecting inventory objects from the first interior space. The user may have moved all of the selected objects to the second interior space, and may therefore be ready to "check out." If the user input has not been received ("NO" to step 506), then processing may return to step 504, and as described above, the processes in steps 504 and 506 may be repeated until manually stopped. If a user input is received ("YES" to step 506), then processing may continue to step 508.

At step 508, a high-power RFID scan of the second interior space is performed to identify objects in the second interior space. In some embodiments, the user may place all selected inventory objects on a counter in the second interior space, and an RFID antenna below the counter may perform the high-power RFID scan. In some embodiments, each RFID antenna in the second interior space performs a high-power RFID scan. Processing may then continue to step 510.

At step 510, a list of objects moved to the second interior space (e.g., from the first interior space) is determined based on both the low-power RFID scans and the high-power RFID scan of the second interior space. In some embodiments, the high-power RFID scan results may be compared to the continuous low-power RFID scan results in order to verify the accuracy of the RFID scans of the second interior space and to determine an accurate list of objects removed from the first interior space. For example, an object detected in the low-power RFID scan may be missed in the high-power scan (e.g., if a first object on the counter is stacked on a second object made of metal, where the metal may block the RFID tag of the first object from being scanned). Conversely, an object may be detected in the high-power RFID scan, but not detected in the low-power RFID scanning. Furthermore, in some embodiments additional RFID scans may be performed (e.g., in the first interior space or in an exterior space) in order to further verify the accuracy of the determined list of objects in the second interior space. In some embodiments, the accurate list of objects removed from the first interior space may then be displayed to the user.

In some embodiments, the low-power RFID scan is performed as part of a first scanning profile and the high-power RFID scan is performed as part of a second scanning profile. A scanning profile may include multiple scanning sessions, which may include one or more of a dual target session, a single target session, and a single target session with suppression.

Figure 6:
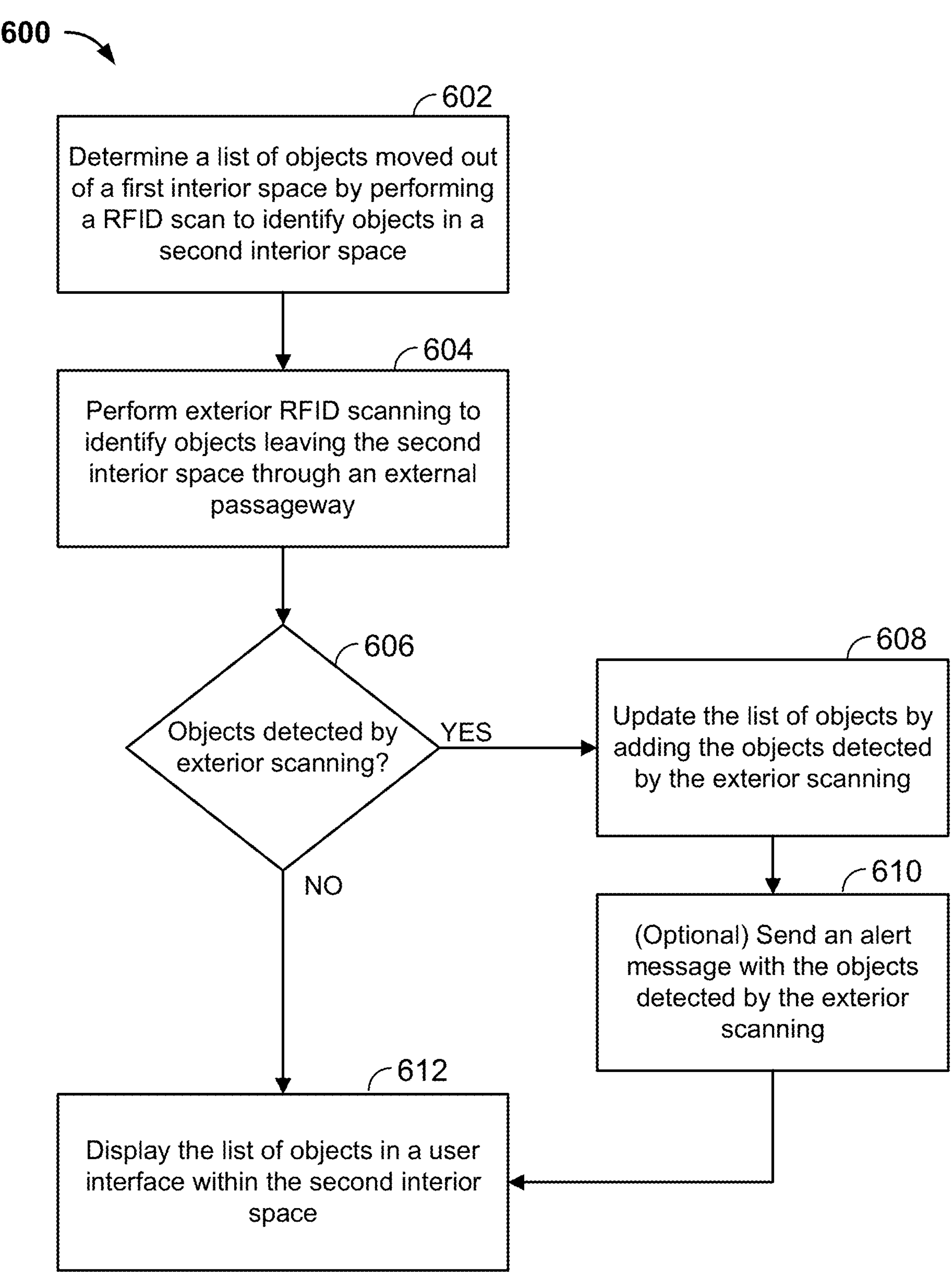
FIG. 6 shows a flowchart of illustrative steps for determining a list of objects moved out of a first interior space based on RFID scanning of both a second interior space and an external space, in accordance with some embodiments of the present disclosure.

FIG. 6 shows a flowchart 600 of illustrative steps for determining a list of objects moved out of a first interior space based on RFID scanning of both a second interior space and an exterior space, in accordance with some embodiments of the present disclosure. The steps of FIG. 6 may be performed, for example, using a processor (e.g., processor 1104 of FIG. 11). In some embodiments, the process depicted in FIG. 6 may occur during an authenticated session. In some embodiments, the objects may include inventory objects (e.g., initially stored in a first interior space, as shown in FIG. 2A). In some embodiments, the steps of FIG. 6 may be performed after or with the steps of FIG. 5, in order to verify the list of objects detected during the process described in connection with FIG. 5 (e.g., at step 510). Although FIG. 6 is described in the context of the particular structures, components, and processing of the present disclosure, and although a particular order and flow of steps are depicted in FIG. 6, it will be understood that in some embodiments, one or more of the steps may be modified, moved, removed, or added, and that the order of steps depicted in FIG. 6 may be modified.

Processing begins at step 602, where a list of objects moved out of a first interior space is determined based on performing an RFID scan to identify objects in a second interior space. The list of objects may be determined, for example, by executing the steps of FIG. 5 (e.g., using the processor) and determining the list of objects at step 510. Processing then continues to step 604.

At step 604, exterior RFID scanning is performed in order to identify objects leaving the second interior space through an external passageway. In some embodiments, the exterior scanning in step 604 may be performed throughout the authenticated session (e.g., exterior scanning may be occurring even before the list of objects are determined in step 602), such that any item leaving the interior spaces during the authenticated session is detected by the exterior RFID scanning. Processing then continues to step 606.

At step 606, the processor determines if objects were detected during the exterior RFID scans. If any objects were detected by any exterior RFID scans performed during the authenticated session ("YES" to step 606), then processing proceeds to step 608. If no objects were detected by any exterior RFID scans, then processing continues to step 612.

At step 608, the list of objects determined in step 602 is updated to further include the objects detected by the exterior RFID scanning. In some embodiments, an optional step 610 may send an alert message with the objects detected by the exterior scanning. The alert may be sent to either a user associated with the authenticated session, an administrator, some other suitable or related person, or a combination thereof. The alert may be sent by email or text (e.g., to a user device), or may be a visual or audio alert indication from a device located in the interior spaces. Processing may then continue to step 612.

At step 612, the list of objects is displayed in a user interface located within the second interior space. In some embodiments, the user interface may be located on a counter in the second interior space. If objects were not detected by exterior RFID scans ("NO" to step 606), the displayed list of objects should correspond to the determined list of objects in step 602. If objects were detected by exterior RFID scans ("YES" to step 606), the displayed list of objects should list both the determined list of objects in step 602 with the additional objects detected by the exterior RFID scans included. In some embodiments, the user interface may include a touch screen, and the user may be given the option to confirm that the displayed list of objects is correct, or to edit or remove objects from the list of objects (e.g., in case of erroneous RFID scan results). As described in connection with FIG. 1, in some embodiments where the user edits the displayed list of objects, additional RFID scanning may be performed in order to verify locations of the edited objects.

Figure 7:
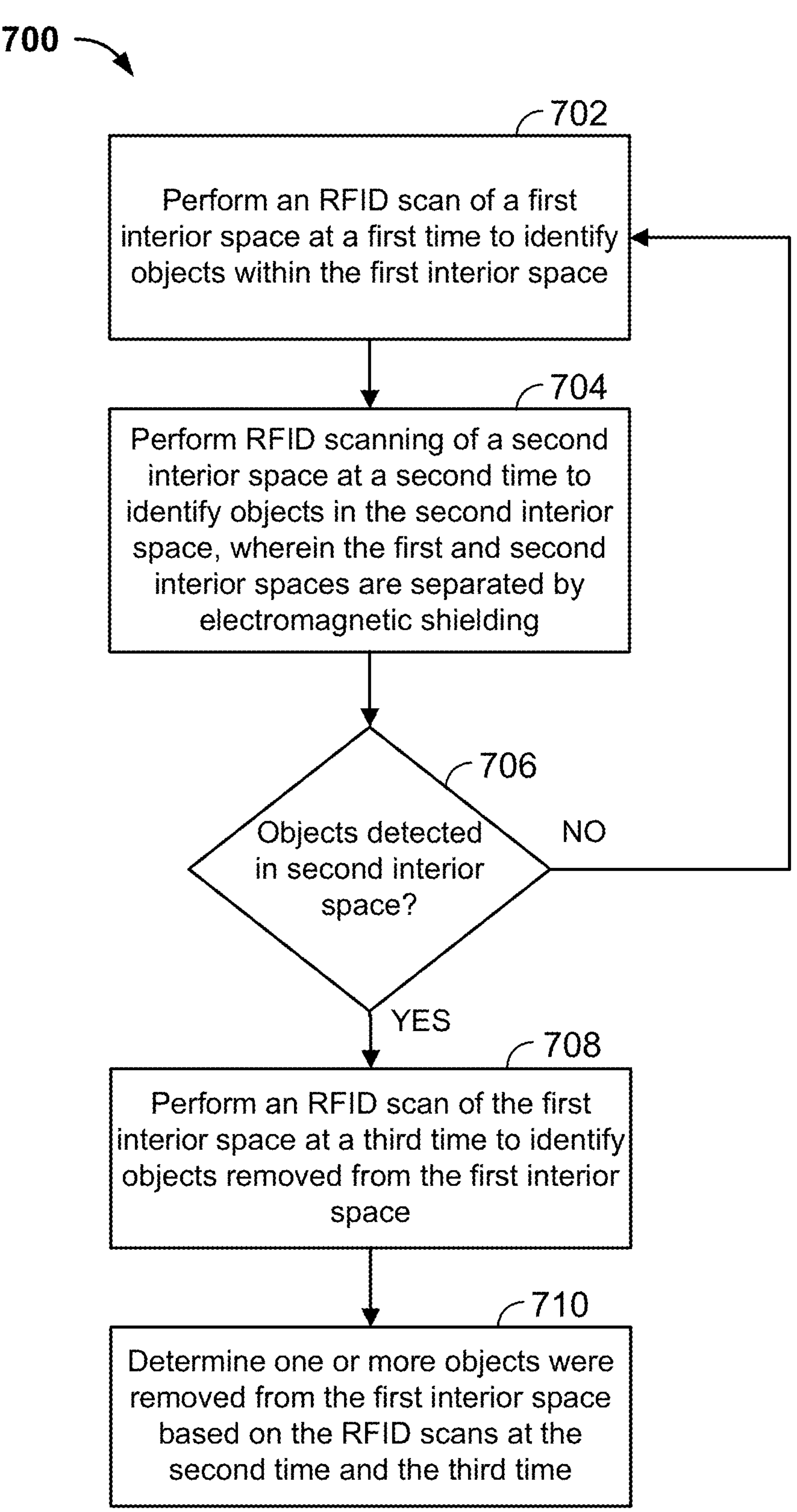
FIG. 7 shows an illustrative flowchart of steps for determining one or more objects being removed from a first interior space based on RFID scans in the first interior space and a second interior space, in accordance with some embodiments of the present disclosure.

FIG. 7 shows an illustrative flowchart 700 of steps for determining one or more objects being removed from a first interior space based on RFID scans in the first interior space and a second interior space, in accordance with some embodiments of the present disclosure. The steps of FIG. 7 may be performed, for example, using a processor (e.g., processor 1104 of FIG. 11). In some embodiments, the process depicted in FIG. 7 may occur during an authenticated session. In some embodiments, the objects may include inventory objects (e.g., initially stored in the first interior space, as shown in FIG. 2A). Although FIG. 7 is described in the context of the particular structures, components, and processing of the present disclosure, and although a particular order and flow of steps are depicted in FIG. 7, it will be understood that in some embodiments, one or more of the steps may be modified, moved, removed, or added, and that the order of steps depicted in FIG. 7 may be modified.

Processing begins at step 702, where RFID scanning is performed in a first interior space at a first time to identify objects within the first interior space. In some embodiments, the RFID scan of the first interior space at step 702 may be performed before an authenticated session begins, and may be performed in order to determine a list of available inventory objects. In some embodiments where the first interior space includes multiple subspaces (e.g., a freezer subspace and a dry goods subspace, as shown in FIG. 3), individual RFID scans of each of the subspaces may be performed, and the RFID scan at step 702 may further determine which subspace each object is located in. Processing may then continue to step 704.

At step 704, RFID scanning of the second interior space is performed at a second time to identify objects in the second interior space. It will be understood that the first and second interior spaces may be separated by electromagnetic shielding, such that RFID scans in the first interior space should not detect objects located in the second interior space, and RFID scans in the second interior space should not detect objects located in the first interior space. In some embodiments, the second time may occur after the first time. For example, the second time may be any time during the authenticated session, or may include the entire time period of the authenticated session, where continuous low-power RFID scanning of the second interior space is performed during the authenticated session. As another example, the second time may occur when the user initiates a "checkout" process (such as the high-power scanning process described in connection with FIG. 2B). In some embodiments, additional scans may be performed at the second time, such as exterior RFID scanning. Processing may then continue to step 706.

At step 706, the processor determines after the second time if objects were detected in the second interior space by the RFID scanning during the second time at step 704. In some embodiments where additional exterior RFID scans were performed at step 704, the processor may also check at step 706 if objects were detected in either the second interior space or the exterior space. If objects were detected ("YES" to step 706), processing continues to step 708. If objects were not detected ("NO" to step 706), then processing returns to step 702. Such a result may occur, for example, if a user associated with the authenticated session ends the authenticated session and leaves without selecting any objects from the inventory objects.

At step 708, an RFID scan of the first interior space is performed at a third time. In some embodiments, the third time may occur after the second time. For example, the third time may occur after the user ends the authentication session (e.g., a high-power RFID scan of the second interior space is completed and the user exits the interior spaces). Processing then continues to step 710.

At step 710, the processor determines one or more objects were removed from the first interior space based on the RFID scans at the second time and the third time. In some embodiments, the RFID scan of the first interior space at the third time (e.g., at step 708) may be utilized to confirm that the objects identified in the RFID scanning of the second interior space at the second time (e.g., at step 704) are no longer in the first interior space. For example, in order to determine that the objects are no longer in the first interior space, the RFID scan of the first interior space at the third time may be compared to the RFID scan of the first interior space at the first time (e.g., at step 702), where the difference in the results between the two scans indicate which objects are no longer in the first interior space. For example, looking at FIGS. 2A and 2B, if the scan of FIG. 2A (e.g., at a first time) detects seven objects in the first interior space, and the scan of FIG. 2B (e.g., at the third time) detects only objects 1, 2, 4, and 6 still in the first interior space, then it can be determined that objects 3, 5, and 7 were removed from the first space. In some embodiments, the one or more objects may be determined based on only the RFID scans at the second time, only the RFID scans at the third time, or both (e.g., the determined objects based on only the third time may be used to verify the accuracy of the determined objects based on only the second time).

It will be understood that while FIGS. 5-7 provide different illustrative examples of processes for determining if (and also which) objects are removed from inventory in a first interior space. To increase the accuracy of the determining, the steps and/or processes described in connection with FIGS. 5-7 may be combined or utilized together to verify the accuracy of the inventory objects being removed. In some embodiments, if two or more of the processes depicted in FIGS. 5-7 are executed during an authenticated session, and there are discrepancies in the objects determined from the executed processes, then an alert may be sent to either the user, an administrator, or a combination thereof, and a manual check (e.g., by a camera system, a manual inspection, some other suitable method, or a combination thereof) may be performed to determine the correct list of objects being removed from the inventory in the first interior space.

Figure 8:
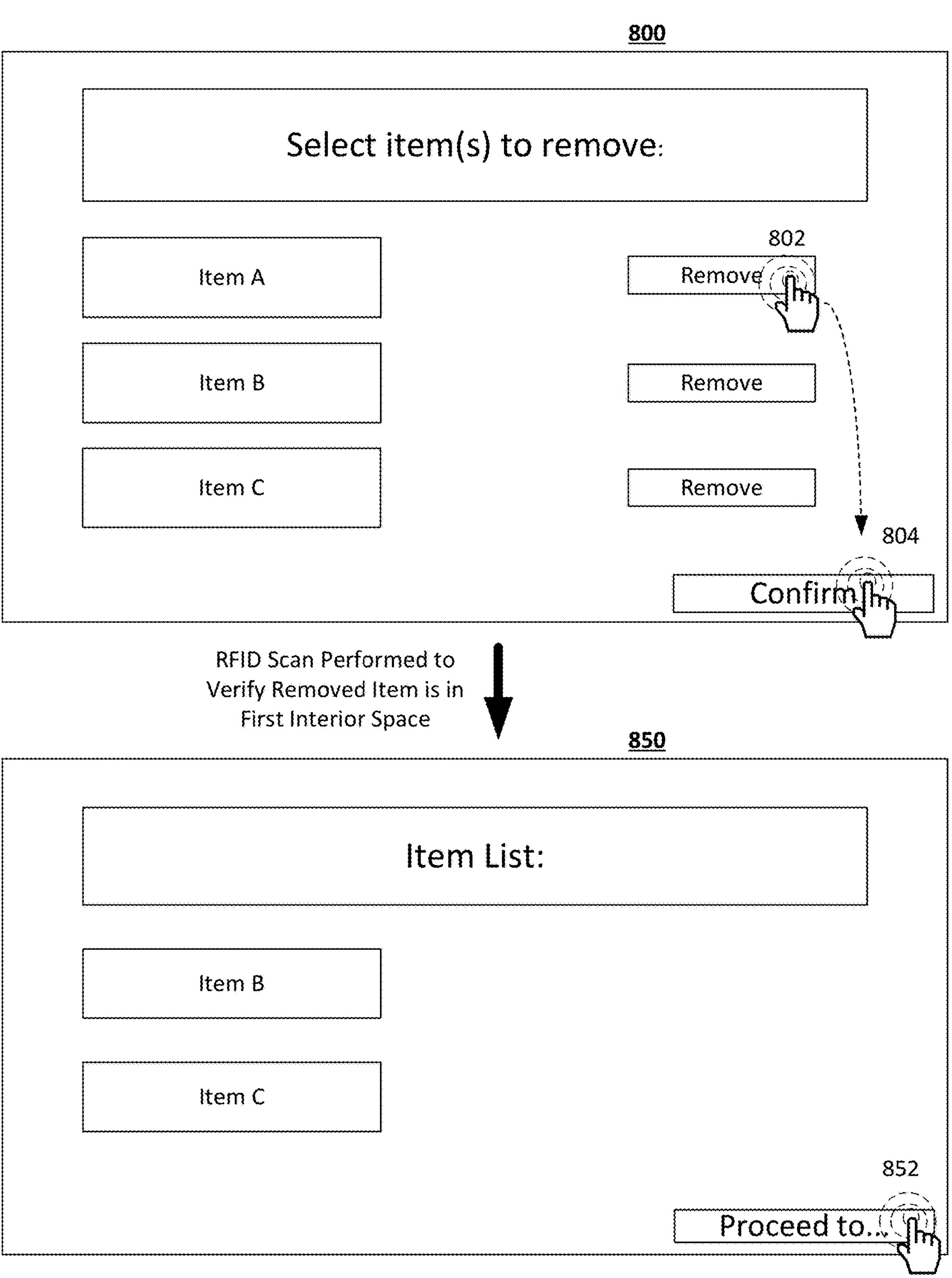
FIG. 8 shows illustrative example displays of a user interface as a user associated with a currently running authenticated session manually removes an item from a list of displayed objects, in accordance with some embodiments of the present disclosure.

FIG. 8 shows illustrative example displays 800 and 850 of a user interface as a user associated with a currently running authenticated session manually removes an item from a list of displayed objects, in accordance with some embodiments of the present disclosure. In some embodiments, the user may initiate an authenticated session, enter a first interior space containing a plurality of inventory objects, and select and move one or more of the inventory objects to a second interior space. Objects moved out of the first interior space may be detected using any of the processes described in connection with FIGS. 5-7 (or a combination thereof) in order to determine a list of objects moved out of the first interior space. When the user finishes selecting and moving the objects and initiates a "checkout" process, a user interface on a counter in the second interior space may include display 800, which displays the list of objects on the interface. In some embodiments, the user interface includes a touch screen, and the user may utilize the touch screen to interact with the list of objects being displayed. For example, as shown for each object in the list of objects there is a corresponding prompt on display 800 to manually "remove" the object from the list, which the user may select (e.g., by a tap 802 on the display 800). The user may select one or more objects to remove, and once all of the objects that the user wishes to remove are selected, the user may then confirm (e.g., tap 804) the selected objects.

In some embodiments, after the user confirms the objects to remove, RFID scanning may be performed (e.g., by processor 1104) to verify that the selected objects are in the first interior space. For example, if the user is attempting to remove an item that is not detected by the RFID scans, the item may be reassociated with the user and relisted on the display. In another example, the item may remain removed from the list, but an alert may instead be sent to an administrator flagging the missing item, and the administrator may later perform a manual inspection of the first interior space and/or check camera footage, and reassociate the missing item with the user based on the results. If the selected objects are verified as being in the first interior space, then the user interface may be updated as shown in display 850.

Display 850 includes the updated list of objects after verifying the removed objects are in the first interior space. As shown, the user selected to remove Item A (e.g., via taps 802 and 804 on display 800), and the subsequent item list includes Objects B and C, but not Item A. The user may then confirm on display 850 (e.g., tap 852 as shown) that the list of objects displayed is correct. In some embodiments, the "Proceed to . . . " button on display 850, when selected by the user, may also result in the authenticated session being ended.

Figure 9A:
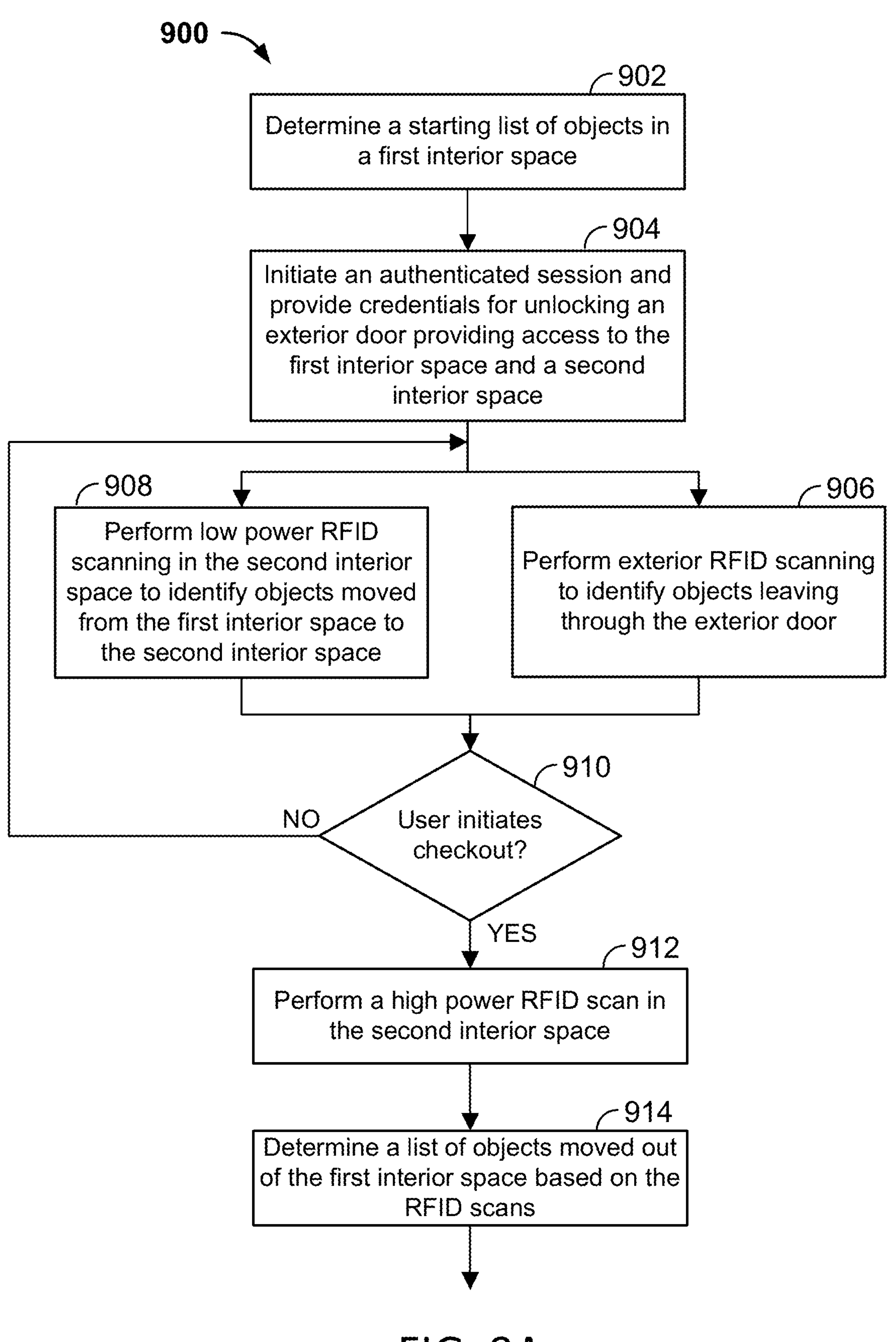
FIGS. 9A-9B shows illustrative flowcharts of steps associating a list of objects with a user through an authenticated session process, in accordance with some embodiments of the present disclosure.
Figure 9B:
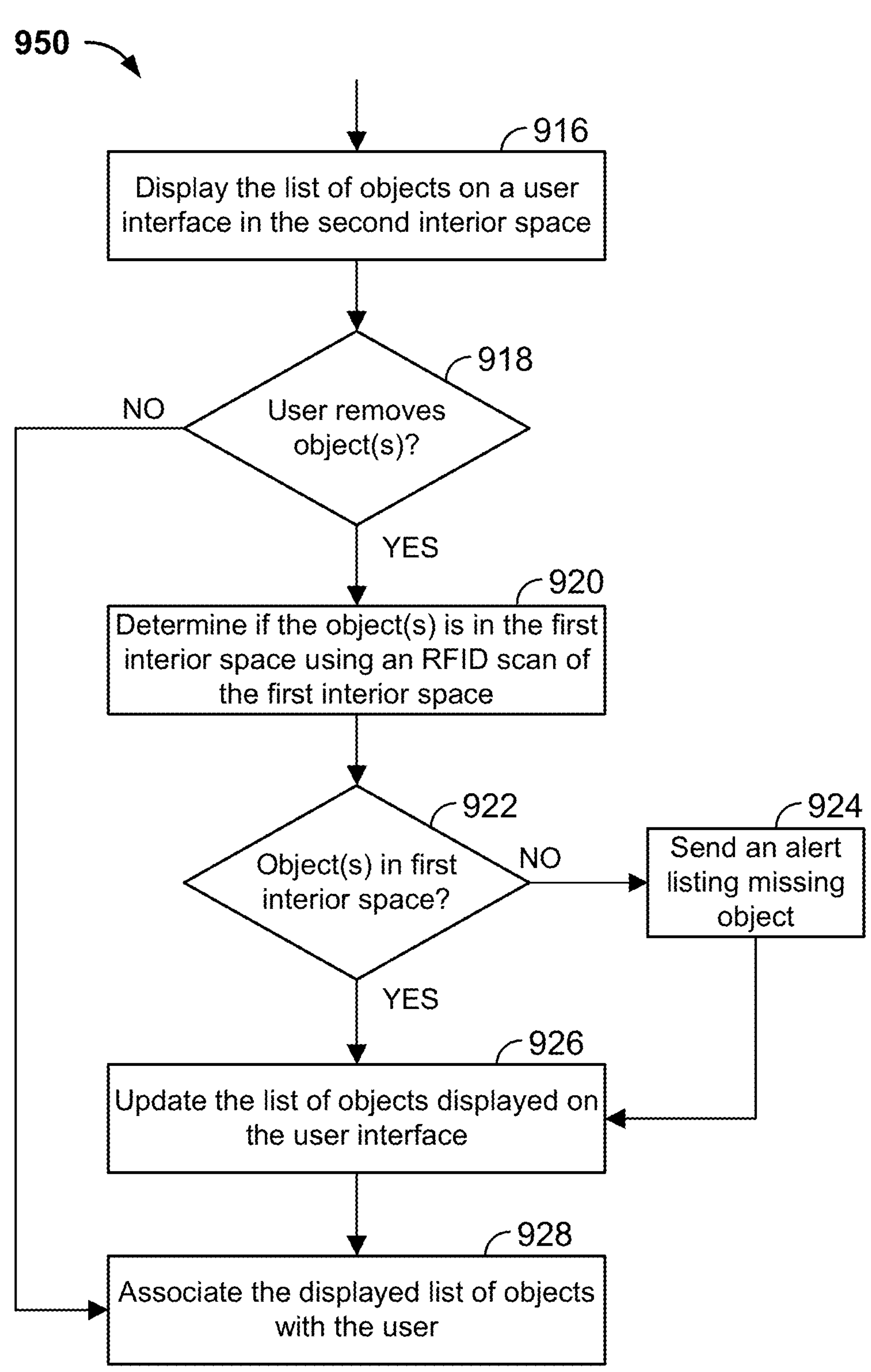

FIGS. 9A-9B shows illustrative flowcharts 900 and 950 of steps associating a list of objects with a user through an authenticated session process, in accordance with some embodiments of the present disclosure. It will be understood that the process of FIG. 9B is a continuation of the process depicted in the steps of FIG. 9A (e.g., where the steps of flowchart 950 may be executed immediately after the steps of flowchart 900 are executed). The steps of FIGS. 9A-9B may be performed, for example, using a processor (e.g., processor 1104 of FIG. 11). In some embodiments, the objects may include inventory objects (e.g., initially stored in the first interior space, as shown in FIG. 2A). It will be understood that flowchart 900 and flowchart 950 may combine the steps and processes described in connection with FIGS. 5-8 into a comprehensive high-level process executed during and/or throughout an authenticated session with an associated user. Although FIGS. 9A-9B are described in the context of the particular structures, components, and processing of the present disclosure, and although a particular order and flow of steps are depicted in FIGS. 9A-9B, it will be understood that in some embodiments, one or more of the steps may be modified, moved, removed, or added, and that the order of steps depicted in FIGS. 9A-9B may be modified.

Processing begins at step 902, where a starting list of objects in a first interior space is determined. The starting list of objects may be determined, for example, by performing RFID scanning in the first interior space (e.g., using processor 1104). An example starting list of objects is shown in FIG. 2A, where RFID scanning of the first interior space detects the seven items listed in the "RFID Scans" table. Processing may then continue to step 904.

At step 904, an authenticated session may be initiated. The initiating may occur, for example, when a user associated with the authenticated session inputs a passcode on a secure device (e.g., access panel 109), scans an associated user device on the secure device, requests an authenticated session on a user device (e.g., via an application), some other suitable verification method, or a combination thereof. After initiating the authenticated session, the user may provide credentials such as a passcode, fingerprint, some other suitable credentials, or a combination thereof, which unlocks an exterior door (e.g., exterior door 108) so that the user may access a first interior space and a second interior space. In an illustrative example, two factor authentication may be used where a user logs into a website or application on a user device (e.g., a smartphone) and a code is provided (e.g., on the website, the application, or via a text message) for entering into access panel 109. It will be understood that the first interior space, second interior space, and exterior space may all be individually separated from one another using electromagnetic shielding, such that RFID scanning in one space should not capture any objects located in a different space. Processing may then continue to steps 906 and 908.

At step 906, exterior RFID scanning may be performed to identify objects leaving through the exterior door. In some embodiments, step 908 may be executed at the same time as step 906, where at step 908 low-power RFID scanning in the second interior space is performed to identify objects moved from the first interior space to the second interior space. With steps 906 and 908 being executed as soon as the authenticated session is initiated (or after an exterior door is opened for a first time), any item moved out of the first interior space should be detected and subsequently associated with the user. Processing then continues to step 910.

At step 910, the processor determines if the user has initiated a checkout process. In some embodiments, the user may initiate the checkout by inputting a command on a touch screen on a user interface, where the user interface may be located on a counter in the second interior space. In some embodiments, the user may initiate the checkout using a user device (e.g., via an application installed on the user device). If a user-initiated checkout is detected ("YES" to step 910), processing continues to step 912. If a user-initiated checkout is not detected ("NO" to step 910), the process returns to steps 906 and 908. Therefore, until the user-initiated checkout process begins, continuous exterior RFID scanning and low-power RFID scanning of the second interior space will be performed throughout the authenticated session.

At step 912, a high-power RFID scan is performed in the second interior space in response to detecting that the user has initiated the checkout process. As described in step 508 of flowchart 500, the high-power RFID scan of the second interior space may more accurately determine which objects are present in the second interior space compared to the low-power RFID scan. Processing may then continue to step 914.

At step 914, a list of objects moved out of the first interior space is determined based on the RFID scans performed during steps 902 to 912. For example, objects detected by the low-power RFID scan in the second interior space may be compared to the objects detected in the high-power RFID scan of the second interior space for verification. Additionally, in some embodiments the objects detected leaving through the exterior door (e.g., via the exterior RFID scanning) may be added to the list of objects detected in the second interior space. In some embodiments, an additional RFID scan of the first interior space may also be performed before step 914, where the results of the RFID scan of the first interior space may be compared to the starting list of objects determined at step 902 as another method of verifying the objects moved out of the first interior space.

Flowchart 950 of FIG. 9B begins with step 916, which is executed after the completion of step 914. At step 916, the list of objects is displayed on a user interface on, for example, a display in the second interior space or on a user device. In some embodiments, the user interface may be on a counter in the second interior space. In some embodiments, the displayed list of objects may be configured as in illustrative example displays 800 and/or 850, where the user is allowed to remove one or more objects from the list, or proceed to confirm that the list of objects matches the objects that the user selected to remove from the first interior space. Processing then continues to step 918.

At step 918, the processor determines if the user removed one or more objects from the list of objects. As described in connection with FIG. 8, the user may remove an object by tapping on the user interface (e.g., if the user interface has a touch sensor). If an object is removed ("YES" to step 918), processing continues to step 920. If an object is not removed ("NO" to step 918), processing instead continues to step 928.

At step 920, an RFID scan is performed in the first interior space to determine if the removed one or more object is in the first interior space. In some embodiments where the first interior space includes a plurality of subspaces (e.g., freezer subspace 406 and dry goods subspace 408 of FIG. 3), then the RFID scan of the first interior space may also further determine which subspace of the plurality of subspaces the detected object is in (e.g., by RFID scanning each of the subspaces). Processing then continues to step 922.

At step 922, the processor confirms if the removed object or objects is in the first interior space. Additionally, if the first interior space includes a plurality of subspaces, the processor may also confirm at step 922 that the object is in an appropriate location in the first interior space (e.g., an object initially stored in a freezer subspace should not be left in a dry goods subspace). If the object is detected in the first interior space (and is also in an appropriate subspace, if applicable), processing continues to step 926. Otherwise, processing continues to step 924.

At step 924, the object is determined to be missing, and a corresponding alert is sent. In some embodiments, the alert may be sent to the user (e.g., notifying the user that the object was improperly returned), to an administrator, to some other suitable personnel, or a combination thereof. Processing then continues to step 926.

At step 926, the list of objects is updated according to the results of steps 920 to 924. In some embodiments, if the object is detected in an appropriate location in the first interior space (i.e., "YES" to step 922), then the object is removed from the list of objects displayed on the user interface. In some embodiments, if the object is not detected in the first interior space, or is not detected in an appropriate location in the first interior space (i.e., "NO" to step 922), then the object may remain on the list of objects displayed on the user interface. In some alternative embodiments, the object may be removed from the list of objects, even if not detected in the first interior space, and instead an alert may be sent to an administrator (e.g., at step 924), and the missing object may be flagged for further review, such as through a manual inspection, viewing camera footage, some other suitable review process, or a combination thereof. Processing may then continue to step 928.

At step 928, the currently displayed list of objects is associated with the user. In some embodiments, each object in the list of objects may have a corresponding price, and the user may also be charged at step 928 for each object associated with the user.

Figure 10:
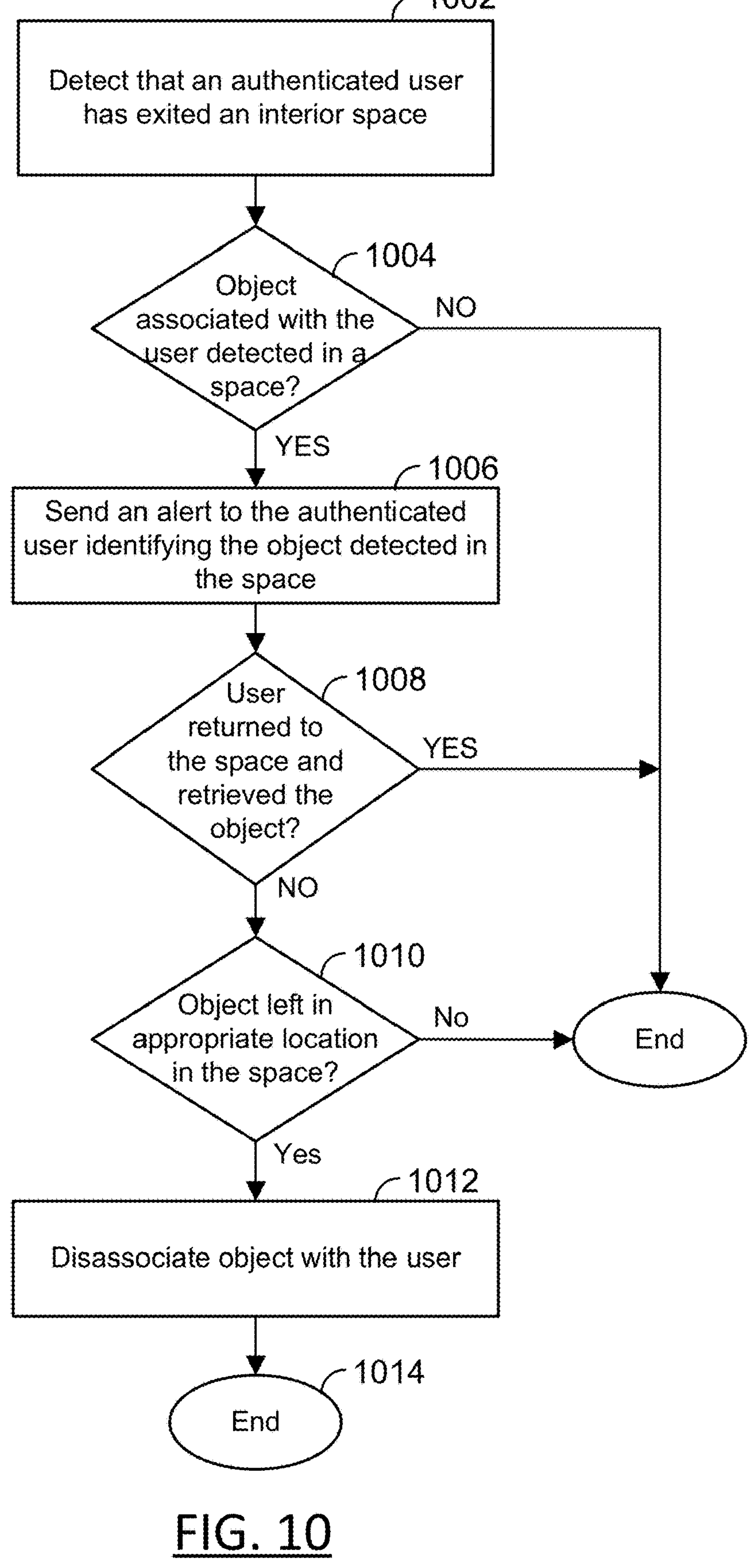
FIG. 10 depicts an illustrative flowchart of steps for a process that occurs if a user associated with an authenticated session leaves an object in an interior checkout space after the authenticated session ends, in accordance with some embodiments of the present disclosure.

FIG. 10 depicts an illustrative flowchart 1000 of steps for a process that occurs if a user associated with an authenticated session leaves an object in an interior checkout space after the authenticated session ends, in accordance with some embodiments of the present disclosure. In some embodiments, the checkout space may be part of an interior space that includes at least a first interior space to store a plurality of inventory objects, where the checkout space may be a second interior space in the interior space. The steps of FIG. 10 may be executed, for example, by a processor (e.g., processor 1104). Although FIG. 10 is described in the context of the particular structures, components, and processing of the present disclosure, and although a particular order and flow of steps are depicted in FIG. 10, it will be understood that in some embodiments, one or more of the steps may be modified, moved, removed, or added, and that the order of steps depicted in FIG. 10 may be modified.

Processing begins at step 1002, where an authenticated user is detected to have exited the interior space. In some embodiments, the authenticated user may exit the interior space through an external passageway connected to the second interior space (i.e., the checkout space) after the associated authenticated session is ended. However, in some embodiments, the user may exit the interior space through a different external passageway (e.g., an emergency exit door attached to the first interior space), and/or may exit the interior space before ending the authenticated session. Additionally, the user may sometimes exit the interior space with an intent to re-enter the interior space thereafter. For example, the user may quickly step out of the interior space to grab an item before returning to the interior space. Therefore, step 1002 may also include additional processes to verify that the user has intended to leave the interior space and/or determine that the user has not returned to the interior space after a short time. In some embodiments, a timer may activate when the user is detected in an exterior space, and when the timer reaches a predetermined time value, the user may be determined to have fully exited the interior space. In some embodiments, the user may receive a prompt or alert (e.g., on a user device associated with the user) when detected in the exterior space, where the prompt may ask the user to manually confirm if the user will be returning to the interior space, or if the user has intended to fully exit the interior space. Processing may then continue to step 1004.

At step 1004, the processor determines if an object associated with the user is detected in a space. In some embodiments, the space may refer to a checkout space (e.g., second interior space 104). In some embodiments where a first interior space for storing inventory objects is divided into multiple subspaces (e.g., freezer 406 and dry goods 408), the space may also include one or more subspaces in the first interior space. For example, for an inventory item initially stored in freezer 406, the space may include both the second interior space and the dry goods subspace. In some embodiments, the processor may determine the object was left behind by performing RFID scanning on the space, the object may be manually detected in the space (e.g., by inspection or camera footage), or a combination thereof. If an object associated with the user is detected in the space ("YES" to step 1004), processing then continues to step 1006. If there is no object associated with the user detected in the space ("NO" to step 1004), then the authenticated session is completed, and the process of flowchart 1000 may be ended.

At step 1006, an alert is sent to the authenticated user, where the alert identifies the object detected in the space (e.g., "Item 1 was left at checkout. Please retrieve Item 1."). In some embodiments, the alert may be sent to the user through a user device, such as a mobile phone. Processing then continues to step 1008.

At step 1008, the processor determines if the user returned to the space and retrieved the object. For example, the user may re-enter the interior space, such that a doorway sensor (e.g., door/doorway sensor 112), a door access panel (e.g., access panel 109), or camera system could detect the user in the interior space. Once the authenticated user is detected to have exited the interior space (e.g., using the same processes as described previously in step 1002) or after a predetermined amount of time after sending the alert, additional RFID scanning may be performed in the space. If the object is no longer detected in the space, then it will be understood that the user has retrieved the object ("YES" to step 1008), and processing then ends, such that the user remains associated with the object. If the object is still detected by RFID scanning, but the user has re-exited the interior space ("NO" to step 1008), processing then continues to step 1010.

At step 1010, the process determines if the object was left in an appropriate location in the space. For example, an object initially located in a dry goods subspace may be in an appropriate location in the second interior space, but an object that was initially located in a freezer subspace would not be in an appropriate location if left in the second interior space. In another example, an object initially in a freezer subspace may be in an inappropriate location if it is returned to a dry goods subspace, even if both subspaces are in a first interior space separate from the checkout space. If the object is in an appropriate location ("YES" to step 1010), processing continues to step 1012. If the object is not in an appropriate location ("NO" to step 1010), then processing ends, and the user remains associated with the object (e.g., because the object may spoil).

At step 1012, the object is disassociated with the user upon determining in step 1010 that the object was left in an appropriate location in the space. Processing may then end, with the authenticated session completed and where the object left behind is no longer associated with the user. The object may then later be manually moved to the correct initial space for continued storage (e.g., by an administrator).

Figure 11:
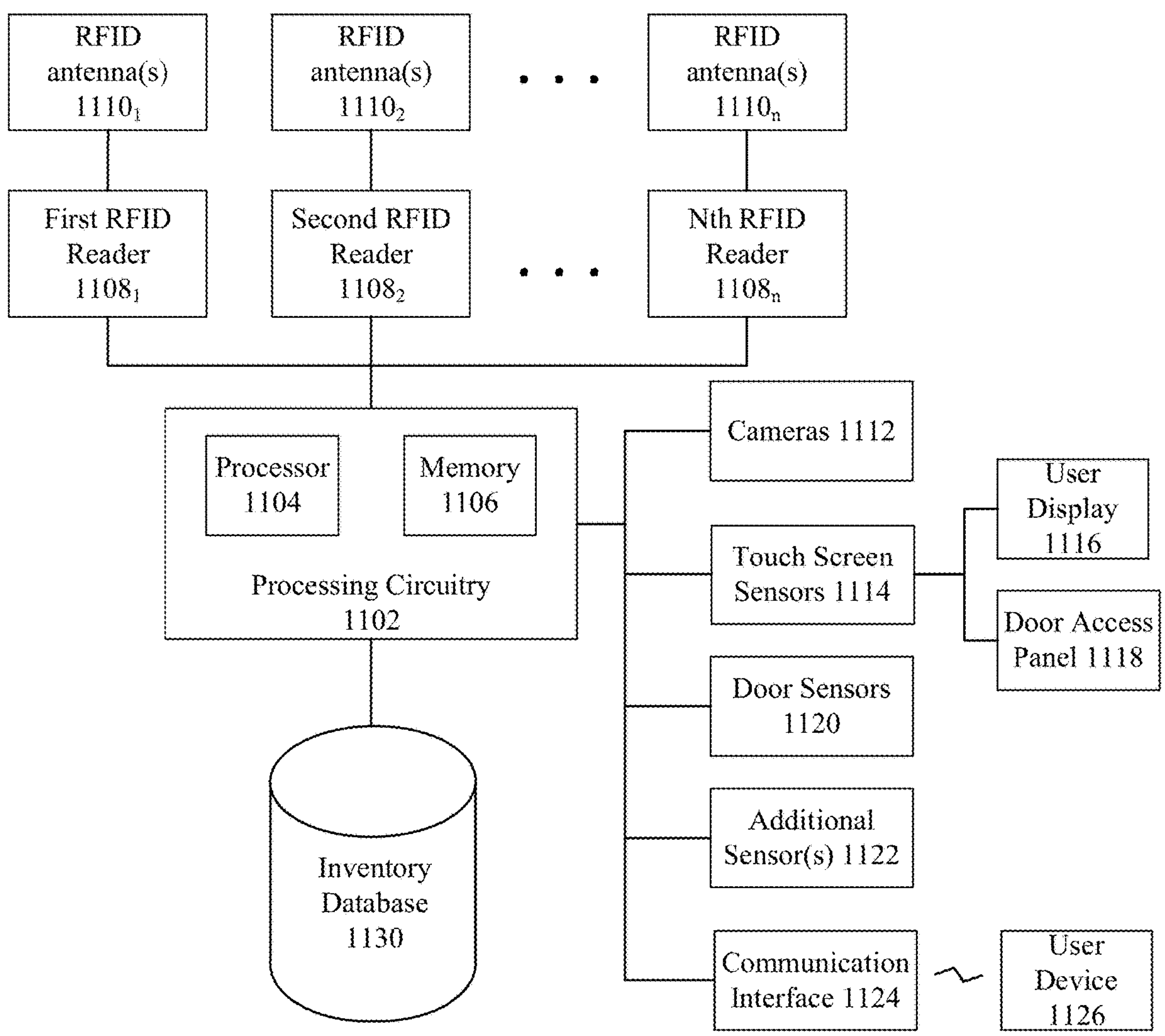
FIG. 11 depicts a system diagram of an illustrative system including a central processing system that includes processing circuitry comprising a processor and a memory, in accordance with some embodiments of the present disclosure.

FIG. 11 depicts a system diagram of an illustrative system 1100 including a central processing system that includes processing circuitry 1102 comprising a processor 1104 and a memory 1106, in accordance with some embodiments of the present disclosure. As shown, the processing circuitry 1102 may further be coupled to an inventory database 1130, a plurality of RFID reader units $\mathbf{1108}_1$-$\mathbf{1108}_n$ (e.g., where each RFID reader unit may also be coupled to one or more corresponding RFID antennas $\mathbf{1110}_1$-$\mathbf{1110}_n$), one or more sensors 1112-1122, a communication interface 1124, and/or user device 1126. In an illustrative example, each respective RFID reader of the present disclosure comprises one of RFID reader units $\mathbf{1108}_1$-$\mathbf{1108}_n$ coupled to up to four corresponding RFID antennas. A first RFID reader unit $\mathbf{1108}_1$ may be coupled to RFID antenna(s) $\mathbf{1110}_1$, where RFID antenna(s) $\mathbf{1110}_1$ may represent up to four RFID antennas that perform RFID scanning on a first interior space, and a second RFID reader unit $\mathbf{1108}_2$ may be coupled to RFID antenna(s) $\mathbf{1110}_2$, where RFID antenna(s) $\mathbf{1110}_2$ may represent up to four RFID antennas that perform RFID scanning on a second interior space. Each respective RFID reader unit 1108 may be placed in a different space, such as a first interior space, a second interior space, an exterior space, other suitable spaces, or a combination thereof, such that the respective coupled RFID antennas may perform RFID scanning on the corresponding space. However, it will be understood that, in some embodiments, a single RFID reader unit may perform the function of two or more RFID readers of the present disclosure. For example, a single RFID reader unit may be coupled to two antennas that are placed in and perform RFID scanning on the first interior space, and two antennas that are placed in and perform RFID scanning on the second interior space. In such an example, the single RFID reader unit may function as both a first RFID reader (e.g., that reads the RFID scans from the antennas in the first interior space) and as a second RFID reader (e.g., that reads the RFID scans from the antennas in the second interior space). The results from the RFID scans are collected by their respective RFID reader unit, and then processed by processor 1104 (e.g., to perform the steps depicted in any of the previously described flowcharts).

Processing circuitry 1102 may include hardware, software, or both, implemented on one or more modules configured to provide control of one or more sensors, which may include at least cameras 1112, touch screen sensors 1114, door sensors 1120, any additional suitable sensors 1122, or a combination thereof. In some embodiments, processor 1104 includes one or more microprocessors, microcontrollers, digital signal processors, programmable logic devices, field-programmable gate arrays (FPGAs), application-specific integrated circuits (ASICs), or any suitable combination thereof. In some embodiments, processor 1104 is distributed across more than one processor or processing units. In some embodiments, control circuitry 1102 executes instructions stored in memory (e.g., non-transitory computer readable media) for object identification and tracking. In some embodiments, memory 1106 is an electronic storage device that is part of control circuitry 1102. For example, memory may be configured to store electronic data, computer instructions, applications, firmware, or any other suitable information. In some embodiments, memory 1106 includes random-access memory, read-only memory, hard drives, optical drives, solid state devices, or any other suitable memory storage devices, or any combination thereof. For example, memory may be used to launch a start-up routine, diagnostic routine, or an inventory tracking routine. In some embodiments, memory 1106 includes non-transitory computer-readable media that includes computer executable instructions for object identification and tracking (e.g., the processes of FIGS. 5-7 and 9A-10).

Touch screen sensors 1114 may be configured to interact with, for example, a user display 1116 or a door access panel 1118. On user display 1116, the user may interact with and/or select from a list of objects using the touch screen sensors 1114. Touch screen sensors may also be utilized on door access panel 1118 for a keypad, in which a user may enter a code on the keypad in order to unlock an exterior door (e.g., exterior door 108) to enter an interior space.

Processing circuitry 1102 may also be coupled to a communication interface 1124, where communication interface 1124 may communicate with a user device 1126. The user device 1126 may be a smartphone having a mobile application that enables authenticated sessions to be initiated and terminated, an identification card (e.g., that may be scanned at certain access panels to grant the user controlled access to different interior spaces), some other suitable user device, or a combination thereof. It will be understood that the user device 1126 may be for an administrative user, a user associated with an authenticated session, some other suitable user, or a combination thereof.

Processing circuitry 1102 may access an inventory database 1130 that includes a list of inventory objects stored in the first interior space. In some embodiments, the inventory database 1130 may be created and then further update each time RFID scanning is performed in the first interior space. In embodiments where the first interior space is divided into a plurality of subspaces (e.g., freezer subspace 406 and dry goods subspace 408), the inventory database 1130 may also include, for each item in the list stored in the database, a corresponding location of the item, and a corresponding list of appropriate locations that the respective item may be placed in (e.g., in order to execute step 1010 in flowchart 1000). In some embodiments, the inventory database 1130 may include a list of RFID tag identification numbers, including relevant identification ranges (e.g., such as the previously described example where identification numbers 1-1000 correspond to frozen objects, and 1001-2000 correspond to dry good objects). The RFID tag identification numbers may include identification numbers for objects in the inventory, identification numbers for tags not yet applied to objects, identification numbers for tags that have been previously associated with users (e.g., in case a user later returns to return an item), or a combination thereof. In some embodiments, inventory database 1130 may store and/or receive data from a land hardline, but it will be understood that inventory database 1130 may also receive data from a cellular and/or satellite network, a cloud, any other suitable data storage, or a combination thereof.

While FIGS. 1-11 are described in the context of an interior space for one user or a single authenticated session, it will be understood that the systems and methods depicted above may be applied to scenarios where the space is used by multiple users at a time or for multiple authenticated sessions at a time. For example, multiple users in the interior space may share access to the inventory, but perform the checkout process in separate spaces in order to correctly associate each removed object with a corresponding user.

Figure 12:
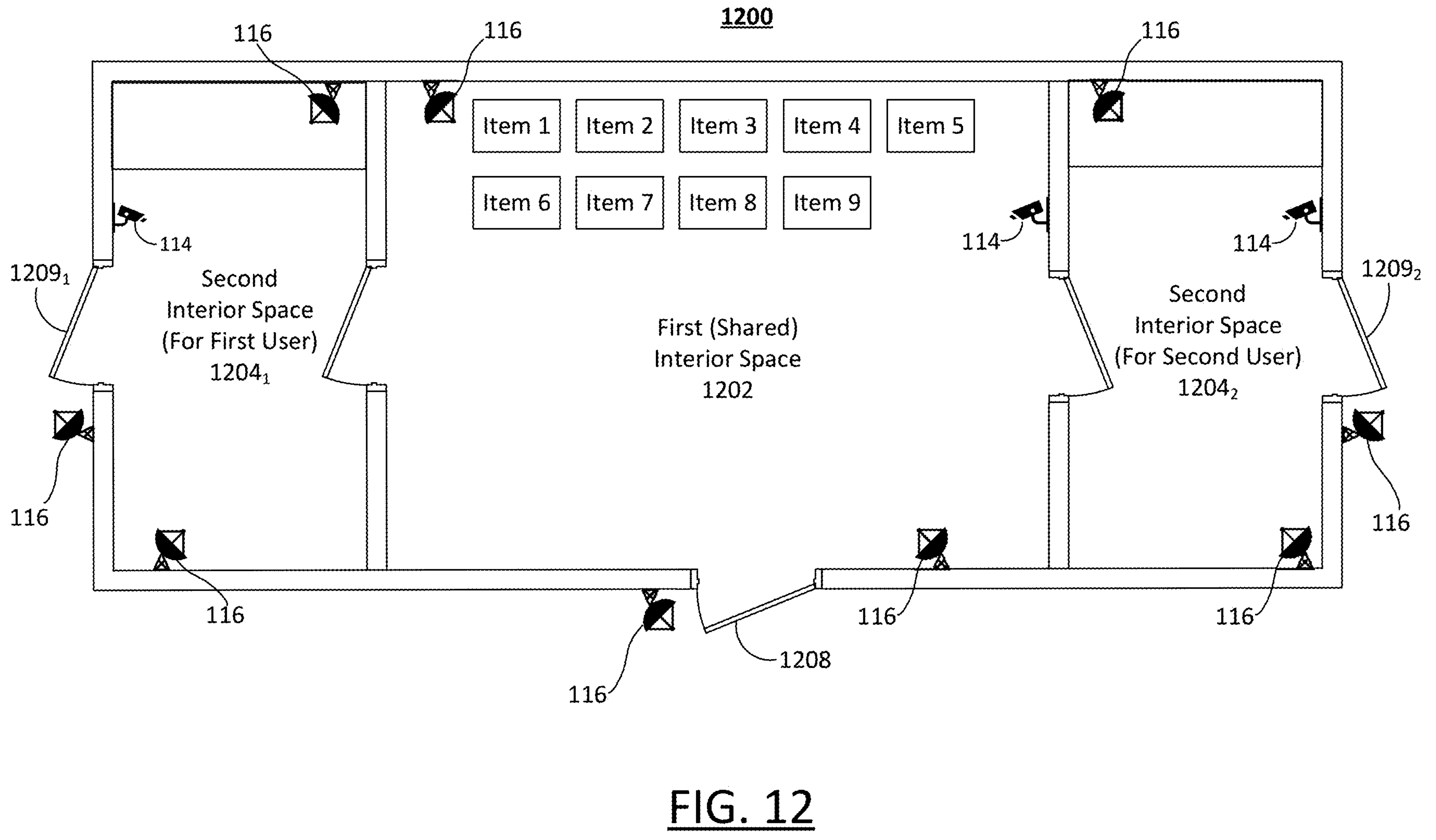
FIG. 12 depicts an illustrative example of an apparatus including a shared first interior space and two second interior spaces, in accordance with some embodiments of the present disclosure.

FIG. 12 depicts an illustrative example of an apparatus 1200 including a shared first interior space 1202 and two second interior spaces $1204_1$ and $1204_2$, in accordance with some embodiments of the present disclosure. It will be understood that apparatus 1200 may accommodate two authenticated sessions simultaneously, and that although FIG. 12 is described in the context of two simultaneous authenticated sessions or users, additional second interior spaces may be added in order to accommodate additional authenticated sessions or users.

Apparatus 1200 includes a first interior space 1202 that can be shared between two users who have simultaneous authenticated sessions. Similar to the previously described first interior spaces (e.g., first interior space 102), first interior space 1202 may function as a storage space for inventory objects that users may select from. As shown, objects 1 through 9 are currently stored in first interior space 1202. First interior space 1202 also includes an exterior entrance door 1208, although it will be understood that the exterior entrance door 1208 may be located in other suitable locations in some other embodiments. For example, each user may enter through a separate exterior entrance door (e.g., a first exterior entrance door for a first user and a second exterior entrance door for a second user), where each respective exterior entrance door connects to a corresponding second interior space $1204_1$ or $1204_2$. However, having a shared exterior entrance door 1208 connecting to the shared first interior space 1202 as shown may be simpler for the two users (e.g., to avoid a scenario where a user may enter through an incorrect door), while also providing the users with immediate access to the inventory space. As described in previous examples, the first interior space 1202 may be equipped with sensors including a camera (e.g., camera 114) and/or one or more RFID antennas connected to a RFID reader. In some embodiments, the sensors may determine a list of inventory objects present in the first interior space 1202 before any authenticated session begins, such as by performing RFID scanning of the first interior space 1202.

Apparatus 1200 includes second interior spaces $1204_1$ and $1204_2$ that function as individual checkout rooms for each user associated with an authenticated session. As shown, second interior spaces $1204_1$ and $1204_2$ are separated from the first interior space 1202. The separation may occur with a doorway that includes electromagnetic shielding (e.g., electromagnetic shielding curtain 106 or an electromagnetic shielded door), where it will be understood that RFID scanning performed in the first interior space 1202 should not detect objects present in the second interior spaces $1204_1$ and $1204_2$, and vice versa. Each user who has an authenticated session may be provided with one of the second interior spaces, and it will be understood that items detected in the second interior spaces will be associated with the corresponding user to that space. In some embodiments, each user may also be provided a means of accessing the provided second interior space. For example, for a first user who is provided with second interior space $1204_1$, the first user may be provided a code only known to the first user. The first user may enter the code on an access panel (e.g., located on a doorway connecting the first interior space 1202 to the second interior space $1204_1$) to access the second interior space $1204_1$. However, if the user attempts to input the access code on an access panel connected to second interior space $1204_2$, the code may be rejected. Similarly, Bluetooth scanning may also be utilized to identify a user device (e.g., a mobile phone with an associated application installed) associated with the first user. When the user device associated with the first user is detected, the door to the second interior space $1204_1$ may be unlocked or opened, and it will be understood that the door to the second interior space $1204_2$ should not open in response to detecting the user device associated with the first user. Therefore, each individual second interior space may also be separated or shielded from each other, such that RFID scanning in second interior space $1204_1$ should not detect objects in the other second interior space $1204_2$ and vice versa, in order to prevent objects removed from the first interior space 1202 from being associated with the incorrect user.

Each individual second interior space may include respective sensors such as a camera 114, RFID antennas 116, and a counter for the respective user to place selected inventory objects. Once the user has selected all desired inventory objects, the user may initiate a checkout process similar to the checkout process described in previous examples involving only one user, and it will be understood that both users may checkout at the same time within their respective second interior spaces. In some embodiments, similar to FIG. 5 low-power RFID scanning of the second interior spaces may be performed while an authenticated session is active. When a user input is detected to initiate the checkout process, a high-power RFID scan of the second interior space associated with the user may also be performed, such that the low-power and high-power RFID scans may cross check each other in order to more accurately determine a list of objects in the second interior space. Additionally, RFID scans of the other spaces may also be performed to verify the accuracy of the list of objects. For instance, if the first user initiates a checkout in second interior space $1204_1$, in addition to performing a high-power RFID scan of second interior space $1204_1$, additional RFID scans may be performed in the first interior space 1202, second interior space $1204_2$, and the exterior space. Each individual second interior space may include a respective exterior exit door (e.g., exterior exit door $1209_1$ and exterior exit door $1209_2$), so that the user in the interior space may exit the interior space after the checkout process is complete without traversing back through the first interior space 1202 (to prevent erroneous RFID scans of the first interior space).

In some embodiments, objects detected to be leaving through the exterior doors (e.g., exterior entrance door 1208, or exterior exit doors $1209_1$ and $1209_2$) are associated with one of the two users, based on which door the objects leave through. For example, if the first user is provided with second interior space $1204_1$, then objects leaving through the associated exit door 1209$_1$ are automatically associated with the first user. Similar to FIG. 6, the first user may receive an alert and/or an updated list of objects that includes the objects detected by exterior scanning. In example cases where objects exit through a shared door (e.g., exterior entrance door 1208), further verification using other sensors, such as a camera, may be utilized to determine which user should be associated with the detected objects.

Figure 13:
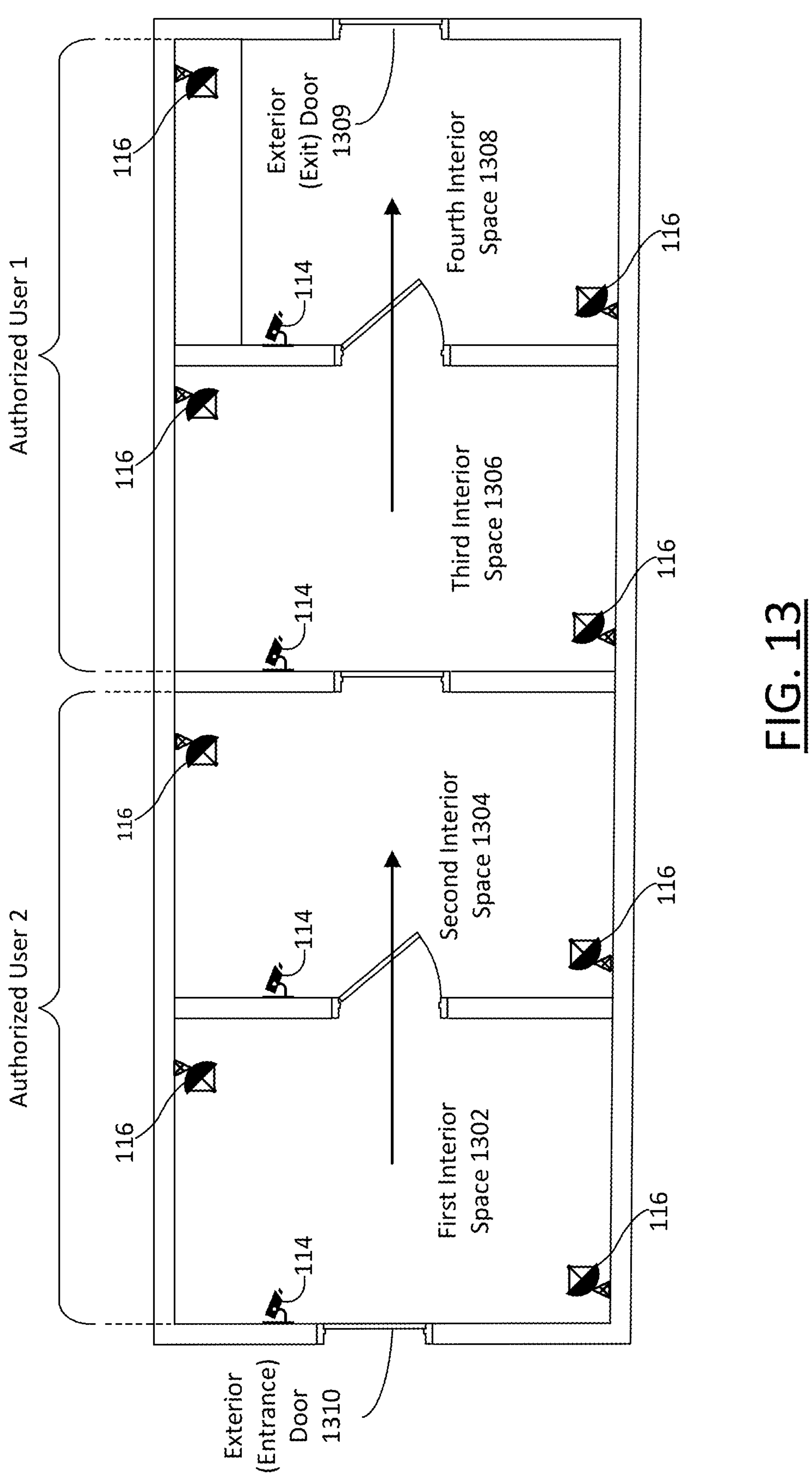
FIG. 13 shows an alternative example of an illustrative apparatus that allows for multiple users to sequentially traverse through a series of interior spaces during an authenticated session, in accordance with some embodiments of the present disclosure.

FIG. 13 shows an alternative example of an illustrative apparatus 1300 that allows for multiple users to sequentially traverse through a series of interior spaces during authenticated sessions, in accordance with some embodiments of the present disclosure. As opposed to apparatus 1200, which allows for multiple users to simultaneously access the shared first interior space, and then simultaneously checkout in respective second interior spaces, apparatus 1300 may include interior spaces that are traversed sequentially, and as a first user leaves certain interior spaces, a second user may be allowed to enter the certain interior spaces while the first user progresses and enters a different group of interior spaces.

Apparatus 1300 includes a first interior space 1302, a second interior space 1304, a third interior space 1306, and a fourth interior space 1308. In some embodiments, the fourth interior space 1308 may function as a checkout space (e.g., similar to second interior space 104), and the other interior spaces 1302-1306 may all have inventory objects that users may select as they progress to the fourth interior space 1308. In some embodiments, each individual interior space may be equipped with RFID antennas and/or a camera, and each individual interior space may be separated from one another with electromagnetic shielding, such that RFID scanning in one of the interior spaces should not detect objects present in another one of the interior spaces. In some embodiments, before an authenticated session begins, respective RFID scans may be performed in each of the interior spaces to determine a list of initial inventory objects in each space.

The first authorized user (i.e., "Authorized User 1") may initiate an authenticated session, and then provide an access code to enter via exterior entrance door 1310 (or as previously described, the first user may have an associated user device that is recognized via Bluetooth scanning, provide some other suitable authentication, or a combination thereof). As shown, the first user would enter into the first interior space 1302, where the user may or may not select objects from the first interior space 1302 before moving to the second interior space 1304. The first user may then repeat a similar process in second interior space 1304.

Second interior space 1304 may be separated from third interior space 1306 with a locking door, such that once the first user enters the third interior space 1306 and closes the locking door they will no longer be able to return to the first or second interior spaces 1302-1304. Therefore, in some embodiments, upon opening the locking door and entering the third interior space 1306, the first user may initiate a "mini-checkout" process utilizing RFID scans to determine a list of objects selected by the first user in the first two interior spaces 1302 and 1304. For example, RFID scans on the first two interior spaces 1302 and 1304 may be performed in order to determine which objects were removed (e.g., by comparing to the initial RFID scans performed before the authenticated session), and an RFID scan of the third interior space 1306 determines which objects from the first two interior spaces 1302 and 1304 the first user is currently carrying.

Accordingly, in some embodiments, as part of the confirmation process before closing the locking door, all currently selected objects may be associated with the first user, and the first user may be provided (e.g., on a user device, user display, or a combination thereof) a list of the associated objects to review. The first user may confirm the list of objects or make changes to the list of objects (as described previously, such as in connection with FIG. 9). Once the user has provided confirmation of the list of objects, the locking door may then be closed, and the first user may no longer have access to the first two interior spaces.

While the first user is selecting objects in the first and second interior spaces 1302-1304, a second user in the exterior space may prepare to initiate an authenticated session. When the first user enters the third interior space 1306, completes the "mini-checkout" process, and the locking door is closed, the second user may then be provided access to enter into the first interior space 1302 through exterior entrance door 1310. Thus, both the first and second users may be in the interior spaces at the same time as shown in FIG. 13, but may not interact or swap objects with each other (to prevent associating selected objects with the wrong users), due to the locked door between second interior space 1304 and third interior space 1306.

Meanwhile, the first user may continue through third interior space 1306, repeating a similar process as in the first interior space 1302 and the second interior space 1304, before progressing into the fourth interior space 1308. At fourth interior space 1308 (i.e., the checkout space), the first user may place all of the selected inventory objects onto a counter in the fourth interior space 1308 and then initiate a checkout process (e.g., high-power RFID scanning, verifying a list of objects on a user display, editing the according list of objects, other processes related to checkout, or a combination thereof). While the first user traverses third interior space 1306 and fourth interior space 1308, the door may remain locked, such that the second user may not progress from the second interior space 1304 to the third interior space 1306. After checkout, the first user may then exit via an exterior exit door 1309 connected to the fourth interior space 1308, and once the first user is detected to have exited the interior spaces, the second user may be allowed to progress from the second interior space 1304 to the third interior space 1306. Once the second user progresses to the third interior space 1306, then the second user may similarly initiate a "mini-checkout" process, after which the locking door will close and the first interior space 1302 and second interior space 1304 may be ready to be accessed by a third user.

In some embodiments, the "mini-checkout" process may be omitted, for example, when the RFID scans are sufficiently accurate. In some embodiments, the checkout process of any the foregoing processes may be omitted when the RFID scans are sufficiently accurate. It will be understood that the controlled access to the spaces and the design of the spaces that enables RFID scanning without identifying objects in adjacent spaces enables accurate inventory tracking and object association with users without relying on computationally intensive camera systems or manual scanning at checkout. Accordingly, the apparatuses and processes of the present disclosure provide an improvement over existing inventory tracking systems.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following paragraphs.

While some portions of this disclosure may refer to examples, any such reference is merely to provide context to the instant disclosure and does not form any admission as to what constitutes the state of the art.

What is claimed is:

1. An apparatus comprising:

a first space coupled to a second space;

a first RFID reader associated with the first space and configured to identify objects within the first space; and a second RFID reader associated with the second space and configured to identify objects within the second space, wherein the first and second spaces are separated by electromagnetic shielding such that the first RFID reader is not able to identify objects within the second space and the second RFID reader is not able to identify objects within the first space.

2. The apparatus of claim 1, wherein the first space is a first interior room and the second space is a second interior room.

3. The apparatus of claim 1, further comprising:

a passageway between the first space and the second space; and a door or door curtain for the passageway, wherein the door or door curtain comprises electromagnetic shielding.

4. The apparatus of claim 1, further comprising:

an external passageway comprising a door enabling access to the first and second spaces, wherein the door comprises electromagnetic shielding.

5. The apparatus of claim 1, wherein:

the second space comprises a counter capable of holding objects; and a first RFID antenna is positioned under the counter and a second RFID antenna is positioned on a wall or ceiling of the second space.

6. The apparatus of claim 1, further comprising control circuitry configured to:

generate a first list of objects within the first space based on the first RFID reader; and generate a second list of objects within the second space based on the second RFID reader.

7. The apparatus of claim 1, wherein the second RFID reader is configured to:

operate at a low power during a time period to identify objects moved from the first space to the second space; and operate at a high power, subsequent to the time period, to identify objects within the second space.

8. The apparatus of claim 7, further comprising:

a user interface within the second space configured to detect a user input, wherein the first RFID reader is configured to operate at the high transmit power in response to the user interface detecting the user input.

9. An apparatus comprising:

a first space coupled to a second space;

a first RFID reader associated with the first space and configured to identify objects within the first space;

a second RFID reader associated with the second space and configured to identify objects within the second space, wherein the first and second spaces are separated by electromagnetic shielding; and control circuitry configured to determine a list of objects moved out of the first space by:

detecting objects in the second space using the second RFID reader at a low power during a time period; and detecting objects in the second space, subsequent to the time period, using the second RFID reader at a high power.

10. The apparatus of claim 9, wherein the control circuitry is further configured to determine the list of objects moved out of the first space by detecting, subsequent to the time period, objects remaining in the first space using the first RFID reader.

11. An apparatus comprising:

a first space coupled to a second space;

a first RFID reader associated with the first space and configured to identify objects within the first space;

a second RFID reader associated with the second space and configured to identify objects within the second space, wherein the first and second spaces are separated by electromagnetic shielding;

control circuitry configured to determine a list of objects moved out of the first space; and a user interface within the second space configured to:

display the list of objects; and provide an option to remove an object from the list of objects.

12. The apparatus of claim 11, wherein the control circuitry is configured to, in response to the option being selected, determine whether the object is in the first space using the first RFID reader.

13. The apparatus of claim 1, further comprising control circuitry configured to:

determine a starting list of objects in the first space; and determine a list of objects moved from the first space to the second space when:

the objects from the list of objects are detected, using the second RFID reader, in the second space; and the objects from the list of objects are not detected, using the first RFID reader, in the first space.

14. The apparatus of claim 1, wherein:

the first RFID reader comprises one or more antennas for scanning the first space;

the second RFID reader comprises one or more antennas for scanning the second space; and the first RFID reader and the second RFID reader comprise separate RFID reader units or a shared RFID reader unit.

15. A method comprising:

performing a first RFID scan of a first space to identify objects within the first space;

performing a second RFID scan of a second space to identify objects within the second space, wherein the first and second spaces are separated by electromagnetic shielding such that the first RFID reader is not able to identify objects within the second space and the second RFID reader is not able to identify objects within the first space; and determining, using control circuitry, a list of objects moved from the first space to the second space based on the first and second RFID scans.

16. A method comprising:

initiating an authenticated session;

providing credentials for unlocking an exterior door that provides access to first and second spaces;

performing a first RFID scan of the first space to identify objects within the first space;

performing a second RFID scan of the second space to identify objects within the second space, wherein the first and second spaces are separated by electromagnetic shielding; and determining, using control circuitry, a list of objects moved from the first space to the second space based on the first and second RFID scans.

17. The method of claim 15, further comprising:

displaying, on a user interface, the list of objects; and providing, on the user interface, an option to remove an object from the list.

18. The method of claim 15, wherein performing the second RFID scan of the second space to identify objects within the second space comprises:

operating at a low power during a time period to identify objects being moved to the second space; and operate at a high power, subsequent to the time period, to identify objects within the second space.

19. The method of claim 15, further comprising:

displaying the list of objects; and provide an option to remove an object from the list.

20. The method of claim 19, further comprising:

in response to selection of the option, performing an additional RFID scan of the first space to determine whether the object is in the first space.

* * * * *